United States Patent
Elshafie et al.

(10) Patent No.: US 12,294,980 B2
(45) Date of Patent: May 6, 2025

(54) TECHNIQUES FOR SIDELINK MINI-SLOT ASSIGNMENT AND USE

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 391 days.

(21) Appl. No.: 17/886,961

(22) Filed: Aug. 12, 2022

(65) Prior Publication Data

US 2024/0057045 A1    Feb. 15, 2024

(51) Int. Cl.
H04W 72/04        (2023.01)
H04W 72/0446    (2023.01)
H04W 72/20        (2023.01)
H04W 92/18        (2009.01)

(52) U.S. Cl.
CPC ....... H04W 72/0446 (2013.01); H04W 72/20 (2023.01); *H04W 92/18* (2013.01)

(58) Field of Classification Search
CPC . H04W 72/20; H04W 76/28; H04W 72/0453; H04W 28/0278; H04W 76/14; H04W 40/248; H04W 72/02; H04W 92/18; H04W 72/54; H04W 4/40; H04W 72/25; H04W 72/0446; H04W 72/542; H04W 72/40
See application file for complete search history.

(56) References Cited

U.S. PATENT DOCUMENTS

| | | | | |
|---|---|---|---|---|
| 11,864,161 | B2* | 1/2024 | Lee | H04L 1/1854 |
| 11,902,941 | B2* | 2/2024 | Hwang | H04W 72/40 |
| 11,902,947 | B2* | 2/2024 | Ko | H04W 72/02 |
| 2020/0029340 | A1* | 1/2020 | He | H04W 72/25 |
| 2021/0227604 | A1* | 7/2021 | Huang | H04W 72/20 |
| 2022/0086803 | A1* | 3/2022 | Li | H04W 72/0446 |
| 2022/0312387 | A1* | 9/2022 | Ye | H04L 5/0053 |
| 2022/0346118 | A1* | 10/2022 | Wu | H04L 1/1825 |
| 2022/0361137 | A1* | 11/2022 | Baek | H04L 5/0078 |
| 2022/0417976 | A1* | 12/2022 | Park | H04L 5/0078 |
| 2023/0025259 | A1* | 1/2023 | Farag | H04W 74/0808 |
| 2023/0063472 | A1* | 3/2023 | Freda | H04W 76/28 |

(Continued)

*Primary Examiner* — Jung Liu
(74) *Attorney, Agent, or Firm* — Holland & Hart LLP

(57) ABSTRACT

Methods, systems, and devices for wireless communications are described. A user equipment (UE) may receive control signaling indicating a set of sidelink shared resources of a sidelink shared resource pool, a threshold quantity of mini-slot reservations for the set of sidelink shared resources, and an indication of a sidelink transmission mode of operation, where each slot of one or more slots of the set of sidelink shared resources may include multiple mini-slots. The UE may transmit to one or more sidelink UEs, sidelink control information that may include a reservation of a set of mini-slots of a first slot of the multiple slots, where the quantity of the set of mini-slots satisfies the threshold quantity of mini-slot reservations. The UE may transmit sidelink signaling to the one or more sidelink UEs, via the set of mini-slots according to the sidelink transmission mode of operation associated with the set of mini-slots.

28 Claims, 12 Drawing Sheets

(56) References Cited

U.S. PATENT DOCUMENTS

| | | | | |
|---|---|---|---|---|
| 2023/0171741 A1* | 6/2023 | Ko | ................... | H04W 72/54 |
| | | | | 370/329 |
| 2023/0180266 A1* | 6/2023 | Hwang | ............... | H04W 72/542 |
| | | | | 370/329 |
| 2023/0209576 A1* | 6/2023 | Hwang | ................ | H04W 8/26 |
| | | | | 370/329 |
| 2023/0224967 A1* | 7/2023 | Si | ................ | H04W 74/0875 |
| | | | | 370/329 |
| 2023/0344565 A1* | 10/2023 | Hwang | ............. | H04W 74/0808 |
| 2023/0345512 A1* | 10/2023 | Guo | ................ | H04W 72/51 |
| 2023/0397150 A1* | 12/2023 | Baek | ................ | H04W 64/00 |
| 2024/0031999 A1* | 1/2024 | Yue | ................ | H04W 72/02 |

* cited by examiner

TECHNIQUES FOR SIDELINK MINI-SLOT ASSIGNMENT AND USE

FIELD OF TECHNOLOGY

The following relates to wireless communications, including techniques for sidelink mini-slot assignment and use.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). In some wireless communications system, a UE may communicate with one or more UEs via sidelink communication channels.

SUMMARY

The described techniques relate to improved methods, systems, devices, and apparatuses that support techniques for sidelink mini-slot assignment and use. For example, the described techniques provide for a user equipment (UE) to reserve one or more mini-slots of a sidelink slot via sidelink control information (SCI). The UE may receive control signaling indicating a set of sidelink shared resources of a sidelink shared resource pool, and a threshold quantity of mini-slot reservations for the set of sidelink shared resources, where each slot of multiple slots within the set of sidelink shared resources includes multiple mini-slots. In such examples, the UE may transmit SCI that includes a reservation of a set of mini-slots of a first slot of the multiple slots, where the quantity of mini-slots satisfies a threshold quantity of mini-slot reservations. The UE may transmit sidelink signaling via the set of mini-slots according to a sidelink transmission mode of operation associated with the set of mini-slots.

A method for wireless communications at a UE is described. The method may include receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots, transmitting a SCI including a reservation of a set of mini-slots of a first slot of the set of multiple slots, where a quantity of the set of mini-slots satisfies the threshold quantity of mini-slot reservations, and transmitting sidelink signaling via the set of mini-slots according to a sidelink transmission mode of operation associated with the set of mini-slots.

An apparatus for wireless communications at a UE is described. The apparatus may include a processor, memory coupled with the processor, and instructions stored in the memory. The instructions may be executable by the processor to cause the apparatus to receive control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots, transmit a SCI including a reservation of a set of mini-slots of a first slot of the set of multiple slots, where a quantity of the set of mini-slots satisfies the threshold quantity of mini-slot reservations, and transmit sidelink signaling via the set of mini-slots according to a sidelink transmission mode of operation associated with the set of mini-slots.

Another apparatus for wireless communications at a UE is described. The apparatus may include means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots, means for transmitting a SCI including a reservation of a set of mini-slots of a first slot of the set of multiple slots, where a quantity of the set of mini-slots satisfies the threshold quantity of mini-slot reservations, and means for transmitting sidelink signaling via the set of mini-slots according to a sidelink transmission mode of operation associated with the set of mini-slots.

A non-transitory computer-readable medium storing code for wireless communications at a UE is described. The code may include instructions executable by a processor to receive control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots, transmit a SCI including a reservation of a set of mini-slots of a first slot of the set of multiple slots, where a quantity of the set of mini-slots satisfies the threshold quantity of mini-slot reservations, and transmit sidelink signaling via the set of mini-slots according to a sidelink transmission mode of operation associated with the set of mini-slots.

Some examples of the method, apparatuses, and non-transitory computer-readable medium described herein may further include operations, features, means, or instructions for receiving, in the control signaling, an indication of the sidelink transmission mode of operation, where transmitting the sidelink signaling may be based on the indication of the sidelink transmission mode of operation.

Some examples of the method, apparatuses, and non-transitory computer-readable medium described herein may further include operations, features, means, or instructions for including, in the SCI, an indication of the sidelink transmission mode of operation, where transmitting the sidelink signaling may be based on the indication of the sidelink transmission mode of operation.

In some examples of the method, apparatuses, and non-transitory computer-readable medium described herein, transmitting the sidelink signaling may include operations, features, means, or instructions for transmitting a first transport block (TB) via a first mini-slot of the set of mini-slots according to the sidelink transmission mode of operations and transmitting a second TB via a second mini-slot of the set of mini-slots according to the sidelink transmission mode of operations.

In some examples of the method, apparatuses, and non-transitory computer-readable medium described herein, transmitting the sidelink signaling may include operations, features, means, or instructions for transmitting a first TB via each mini-slot of the set of mini-slots according to the sidelink transmission mode of operations.

Some examples of the method, apparatuses, and non-transitory computer-readable medium described herein may further include operations, features, means, or instructions for including, in the SCI, an indication of a set of slots for retransmissions of the set of mini-slots of the first slot.

In some examples of the method, apparatuses, and non-transitory computer-readable medium described herein, the indication of the set of slots includes a set of time offsets, a set of frequency offsets, or both, each time offset, frequency offset, or both, may be associated with a respective slot of the set of slots.

Some examples of the method, apparatuses, and non-transitory computer-readable medium described herein may further include operations, features, means, or instructions for retransmitting the sidelink signaling via the set of mini-slots within each slot of the set of slots according to the indication of the set of slots.

In some examples of the method, apparatuses, and non-transitory computer-readable medium described herein, the reservation of the set of mini-slots may include operations, features, means, or instructions for a bitmap indicating the set of mini-slots of the set of multiple mini-slots.

In some examples of the method, apparatuses, and non-transitory computer-readable medium described herein, the reservation of the set of mini-slots may include operations, features, means, or instructions for an indication of time resources, frequency resources, or both, for each mini-slot of the set of mini-slots of the set of multiple mini-slots.

In some examples of the method, apparatuses, and non-transitory computer-readable medium described herein, transmitting the SCI may include operations, features, means, or instructions for transmitting a first SCI message including an indication of a first mini-slot of the set of mini-slots and transmitting, in the first mini-slot of the set of mini-slots based on the first SCI message, a second SCI message including an indication of a second mini-slot of the set of mini-slots.

In some examples of the method, apparatuses, and non-transitory computer-readable medium described herein, the first mini-slot includes a first quantity of the set of sidelink shared resources and the second mini-slot includes a second quantity of the set of sidelink shared resources that may be different from the first quantity of the set of sidelink shared resources.

A method for wireless communications at a UE is described. The method may include receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots, receiving a SCI including a reservation of a set of mini-slots of a first slot of the set of multiple slots, where a quantity of the set of mini-slots satisfies the threshold quantity of mini-slot reservations, and performing sidelink communications via one or more of the set of multiple slots according to the reservation of the set of mini-slots.

An apparatus for wireless communications at a UE is described. The apparatus may include a processor, memory coupled with the processor, and instructions stored in the memory. The instructions may be executable by the processor to cause the apparatus to receive control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots, receive a SCI including a reservation of a set of mini-slots of a first slot of the set of multiple slots, where a quantity of the set of mini-slots satisfies the threshold quantity of mini-slot reservations, and perform sidelink communications via one or more of the set of multiple slots according to the reservation of the set of mini-slots.

Another apparatus for wireless communications at a UE is described. The apparatus may include means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots, means for receiving a SCI including a reservation of a set of mini-slots of a first slot of the set of multiple slots, where a quantity of the set of mini-slots satisfies the threshold quantity of mini-slot reservations, and means for performing sidelink communications via one or more of the set of multiple slots according to the reservation of the set of mini-slots.

A non-transitory computer-readable medium storing code for wireless communications at a UE is described. The code may include instructions executable by a processor to receive control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots, receive a SCI including a reservation of a set of mini-slots of a first slot of the set of multiple slots, where a quantity of the set of mini-slots satisfies the threshold quantity of mini-slot reservations, and perform sidelink communications via one or more of the set of multiple slots according to the reservation of the set of mini-slots.

In some examples of the method, apparatuses, and non-transitory computer-readable medium described herein, performing the sidelink communications may include operations, features, means, or instructions for receiving sidelink signaling via the set of mini-slots according to a sidelink transmission mode of operation associated with the set of mini-slots.

Some examples of the method, apparatuses, and non-transitory computer-readable medium described herein may further include operations, features, means, or instructions for receiving, in the control signaling, an indication of a sidelink transmission mode of operation, where receiving the sidelink signaling may be based on the indication of the sidelink transmission mode of operation.

Some examples of the method, apparatuses, and non-transitory computer-readable medium described herein may further include operations, features, means, or instructions for receiving, in the SCI, an indication of the sidelink transmission mode of operation, where receiving the sidelink signaling may be based on the indication of the sidelink transmission mode of operation.

In some examples of the method, apparatuses, and non-transitory computer-readable medium described herein, receiving the sidelink signaling may include operations, features, means, or instructions for receiving a first TB via a first mini-slot of the set of mini-slots according to the sidelink transmission mode of operations and receiving a second TB via a second mini-slot of the set of mini-slots according to the sidelink transmission mode of operations.

In some examples of the method, apparatuses, and non-transitory computer-readable medium described herein, receiving the sidelink signaling may include operations, features, means, or instructions for receiving a first TB via each mini-slot of the set of mini-slots according to the sidelink transmission mode of operations.

In some examples of the method, apparatuses, and non-transitory computer-readable medium described herein, performing the sidelink communications may include operations, features, means, or instructions for refraining from transmitting sidelink signaling via the set of mini-slots based on the reservation of the set of mini-slots.

Some examples of the method, apparatuses, and non-transitory computer-readable medium described herein may further include operations, features, means, or instructions for receiving, in the SCI, an indication of a set of slots for retransmissions of the set of mini-slots of the first slot.

In some examples of the method, apparatuses, and non-transitory computer-readable medium described herein, the indication of the set of slots includes a set of time offsets, a set of frequency offsets, or both, each time offset, frequency offset, or both, may be associated with a respective slot of the set of slots.

In some examples of the method, apparatuses, and non-transitory computer-readable medium described herein, the reservation of the set of mini-slots may include operations, features, means, or instructions for a bitmap indicating the set of mini-slots of the set of multiple mini-slots.

In some examples of the method, apparatuses, and non-transitory computer-readable medium described herein, the reservation of the set of mini-slots may include operations, features, means, or instructions for an indication of time resources, frequency resources, or both, for each mini-slot of the set of mini-slots of the set of multiple mini-slots.

In some examples of the method, apparatuses, and non-transitory computer-readable medium described herein, receiving the SCI may include operations, features, means, or instructions for receiving a first SCI message including an indication of a first mini-slot of the set of mini-slots and receiving, in the first mini-slot of the set of mini-slots based on the first SCI message, a second SCI message including an indication of a second mini-slot of the set of mini-slots.

In some examples of the method, apparatuses, and non-transitory computer-readable medium described herein, the first mini-slot includes a first quantity of the set of sidelink shared resources and the second mini-slot includes a second quantity of the set of sidelink shared resources that may be different from the first quantity of the set of sidelink shared resources.

DETAILED DESCRIPTION

Figure 1:
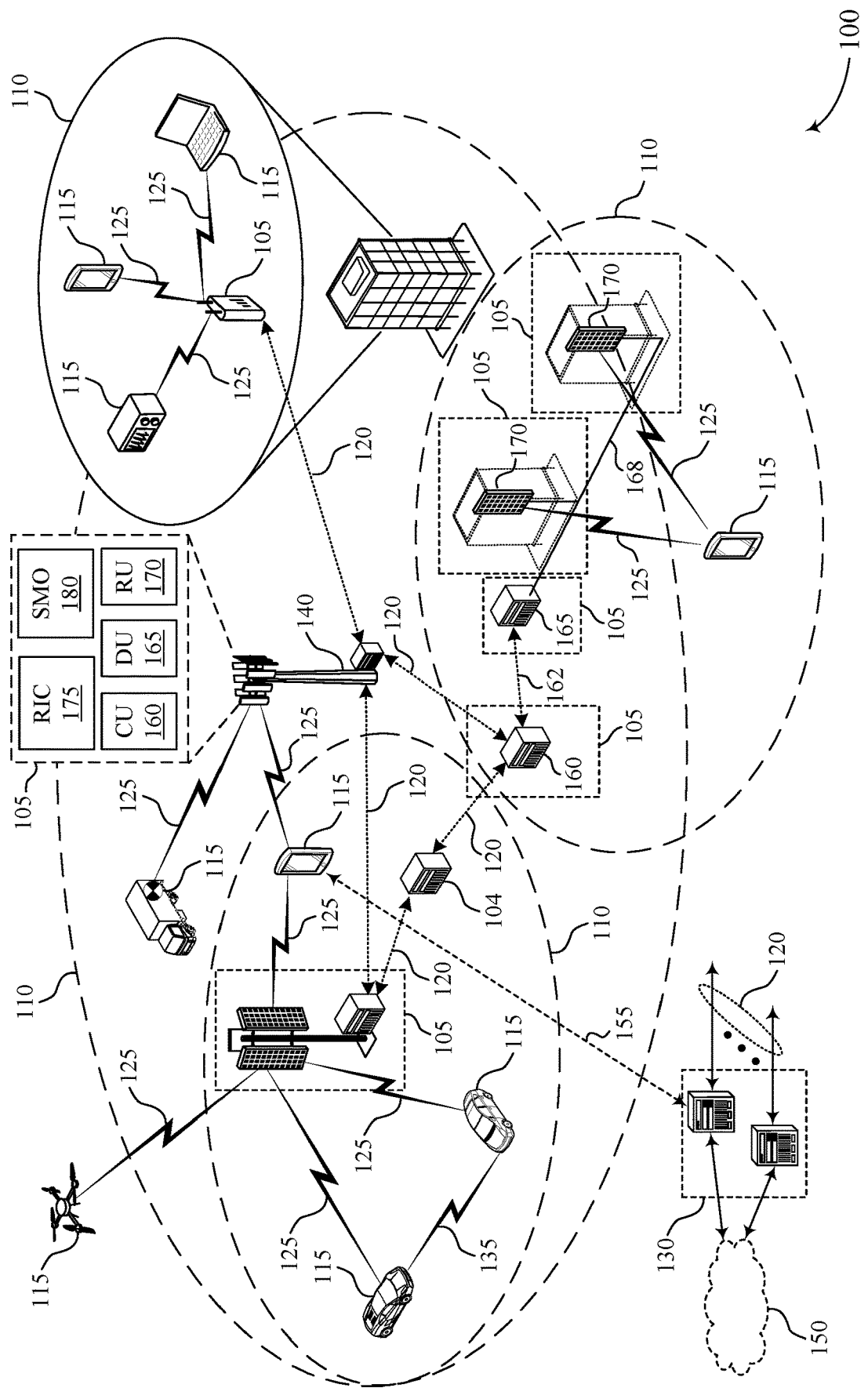
FIG. 1 and FIG. 2 illustrate examples of wireless communications systems that support techniques for sidelink mini-slot assignment and use in accordance with one or more aspects of the present disclosure.

In some wireless communications systems, a user equipment (UE) may communicate with one or more UEs over a sidelink channel. In such systems, the UE may reserve one or more sidelink slots (e.g., resources) and indicate the reserved resources to the one or more UEs via sidelink control information (SCI) sent over a physical sidelink control channel (PSCCH). The UE may transmit sidelink signaling (e.g., one or more transport blocks (TB)) via the reserved sidelink slots on a physical sidelink shared channel (PSSCH) (e.g., may transmit one or more repetitions of a sidelink message via the multiple reserved sidelink slots). To reduce scheduling latency in sidelink communication, the UE may use mini-slots to transmit or receive sidelink signaling. For example, each sidelink slot may be divided into multiple mini-slots (e.g., sub-slots), where each mini-slot has a PSCCH and a PSSCH. The UE may reserve a mini-slot, indicate the reserved mini-slot to one or more UEs via SCI sent in the PSCCH of the mini-slot, and transmit sidelink signaling to one or more UEs via the PSSCH of the mini-slot. Thus, each mini-slot may be self-contained and self-decodable.

In some cases, mini-slots may be separated from each other by a gap, which may facilitate switching between transmitting sidelink data in one mini-slot and receiving sidelink data in another mini-slot. Such gaps may result in unused resources between each mini-slot. As the quantity of mini-slots within a sidelink slot increases, gaps in resources may also increase, resulting in an inefficient use of sidelink resources, increased latency in sidelink communications, reduced efficiency, and decreased user experience. In some examples (e.g., to reduce or avoid an increase in gaps), one or more UEs may communicate via multiple mini-slots according to a given pattern. For example, a sidelink slot may be divided into multiple mini-slots, such that the first portion of the slot is allocated for a PSCCH, and the remainder of the slot (e.g., the remaining mini-slots of the slot) are allocated for sidelink signaling via PSSCHs. However, current techniques for reserving sidelink slots may not support techniques for reserving mini-slots within sidelink slots, which may lead to increased signaling overhead, increased latency in sidelink communication, degraded user experience, among other disadvantages.

The techniques described herein may enable a UE to reserve one or more mini-slots of a sidelink slot via SCI signaling. For example, a UE may receive control signaling indicating a shared sidelink resource pool, a threshold quantity of mini-slot reservations (e.g., three mini-slots) within a given slot, and a sidelink transmission mode of operation. In some implementations, the UE may transmit SCI signaling, via a PSCCH in the first portion of a sidelink slot indicating a reservation of up to the threshold quantity of mini-slot reservations within the sidelink slot (e.g., up to three mini-slots). The UE may use the reserved mini-slots to transmit sidelink signaling according to the sidelink transmission mode of operation. For example, in a first sidelink transmission mode of operation, the UE may transmit a TB in a first mini-slot and retransmit the TB in a second and third mini-slot of the sidelink slot. In a second sidelink transmission mode of operation, the UE may transmit different TBs in each reserved mini-slot. The mode of operation may be indicated via the control signaling, or may be negotiated between UEs (e.g., via sidelink RRC signaling, or sidelink MAC-CE signaling, among other examples).

In some implementations, the UE may transmit SCI signaling in the first mini-slot of the sidelink slot indicating a reservation of up to the threshold quantity of mini-slots within the sidelink slot, as well as a reservation of one or more additional sidelink slots for repetitions of the reserved mini-slots. In some examples, the UE may indicate the reserved mini-slot via an indication of reserved resources, or via a bitmap. In some examples, if the UE reserves resources having different sizes across mini-slots, then the UE may perform sequential reservation (e.g., may reserve a first mini-slot in a first SCI message in the PSCCH, and may then reserve a second mini-slot via a second SCI message, such as an SCI-2 message, in the first reserved mini-slot). Additionally, the UE may indicate the received sidelink transmission mode of operation to one or more UEs via the SCI signaling. Thus, the UE may reserve one or more mini-slots via the PSCCH in the first portion of a sidelink slot and transmit sidelink signaling in the reserved mini-slots, thereby reducing the inefficient use of sidelink resources, decreasing signaling overhead in sidelink mini-slots, and improving user experience.

Aspects of the disclosure are initially described in the context of wireless communications systems. Aspects of the disclosure are further illustrated in the context of a process flow that supports techniques for sidelink mini-slot assignment and use. Aspects of the disclosure are further illustrated by and described with reference to apparatus diagrams, system diagrams, and flowcharts that relate to techniques for sidelink mini-slot assignment and use.

FIG. 1 illustrates an example of a wireless communications system 100 that supports techniques for sidelink mini-slot assignment and use in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for sidelink minislot assignment and use as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, the UE 115 may communicate with one or more UEs 115 over a sidelink channel. For example, the UE 115 may receive higher layer signaling indicating a shared resource pool for sidelink communications, where each resource may include multiple sidelink slots (e.g., time and frequency resources to transmit sidelink data). Additionally, the UE 115 may receive higher layer signaling from the network entity 105 indicating a threshold quantity of sidelink slot reservations (e.g., sl_MaxNumPerReserve), which indicates the amount of sidelink slots the UE 115 may reserve. The UE 115 may determine a frequency resource assignment, a time resource assignment, and a resource reservation period for reserving sidelink slots based on the received threshold quantity of reservations.

For example, the frequency resource assignment bits may be defined as $$\left\lceil \log_2\left(\frac{N_{subChannel}^{SL}(N_{subChannel}^{SL} + 1)}{2}\right) \right\rceil$$

when the value of the threshold quantity of reservations (e.g., sl_MaxNumPerReserve) is configured to be two; otherwise the frequency resource assignment bits may be defined as $$\left\lceil \log_2\left(\frac{N_{subChannel}^{SL}(N_{subChannel}^{SL} + 1)(2N_{subChannel}^{SL} + 1)}{6}\right) \right\rceil$$

when the value of the threshold quantity of reservations (e.g., sl_MaxNumPerReserve) is configured to be three. In such cases, $N_{subChannel}^{SL}$ may be defined as a quantity of sub-channels (e.g., frequency resources) in the shared resource pool.

Further, the UE 115 may also set the time resource assignment bits to five bits when the value of the threshold quantity of reservations (e.g., sl_MaxNumPerReserve) is configured to be two; otherwise, the time resource assignment bits may be set to 9 bits when the value of the threshold quantity of reservations (e.g., sl_MaxNumPerReserve) is configured to be three.

Additionally, the UE 115 may also determine a resource reservation period. For example, the UE 115 may determine the resource reservation period bits as $\lceil \log_2(N_{rsv\_period}) \rceil$, where $N_{rsv\_period}$ is the number of entries in a received higher layer parameter (e.g., sl_ResourceReservePeriodList), if a higher layer parameter indicating that multiple sidelink reservations is configured (e.g., if sl-MultiReserveResource is configured); otherwise the resource reservation period bits may be set to 0.

Thus, the UE 115 may determine the time and frequency resources to reserve for each sidelink slot. The UE 115 may indicate the reserved sidelink slots to one or more sidelink UEs 115 via SCI transmitted in a PSCCH. The UE 115 may transmit a TB (e.g., sidelink data) via the reserved sidelink slots on a PSSCH.

To reduce scheduling latency in sidelink communication, the UE 115 may use mini-slots to transmit or receive a TB. For example, each sidelink slot may be divided into multiple mini-slots where each mini-slot has a PSCCH and a PSSCH. The UE 115 may reserve a mini-slot, indicate the reserved mini-slot to one or more UEs 115 via SCI sent in the PSCCH of the mini-slot, and transmit a TB to one or more UEs 115 via the PSSCH of the mini-slot. Thus, each mini-slot may be self-contained and self-decodable.

In some cases, a UE 115 may switch from transmitting sidelink data in one mini-slot to receiving sidelink data in another mini-slot, which may lead to a gap of unused resources between each mini-slot. As the quantity of mini-slots within a sidelink slot increases, gaps in resources may also increase leading to an inefficient use of sidelink resources, resulting in increased latency in sidelink communications. To reduce gaps, it may be advantageous for a sidelink slot to be divided into multiple mini-slots according to a given pattern. For example, a sidelink slot may be divided into multiple mini-slots, such that the first mini-slot is allocated for a PSCCH, and the remaining mini-slots are allocated for a PSSCH. However, current techniques for reserving sidelink slots may not support techniques for reserving such mini-slots, which may lead to increased signaling overhead, increased latency in sidelink communication, degraded user experience, among other disadvantages.

The techniques described herein may enable the UE 115 to reserve one or more mini-slots of a sidelink slot via SCI signaling. For example, the UE 115 may receive control signaling, from the network entity 105, indicating a shared sidelink resource pool, a threshold quantity of mini-slots (e.g., three mini-slots) that may be reserved within a given slot, and a sidelink transmission mode of operation. In some implementations, the UE 115 may transmit SCI signaling, via a PSCCH, in the first portion of a sidelink slot indicating a reservation of up to the threshold quantity of mini-slots within the sidelink slot (e.g., up to three mini-slots). The UE 115 may use the reserved mini-slots to transmit one or more TBs to one or more UEs 115 according to the sidelink transmission mode of operation. For example, in a first sidelink transmission mode of operation, the UE 115 may transmit a TB in a first mini-slot and retransmit the TB in a second and third mini-slot of the sidelink slot. In a second sidelink transmission mode of operation, the UE 115 may transmit different TBs in each reserved mini-slot.

In some other implementations, the UE 115 may transmit SCI signaling in the first portion of the sidelink slot indicating a reservation of up to the threshold quantity of mini-slots within the sidelink slot, as well as a reservation of one or more additional sidelink slots for repetitions of the reserved mini-slots. Additionally, the UE 115 may indicate the received sidelink transmission mode of operation to one or more UEs 115 via the SCI signaling. Thus, the UE 115 may reserve one or more mini-slots via the PSCCH in the first portion of the sidelink slot and transmit one or more TBs in the reserved mini-slots, thereby reducing the inefficient use of sidelink resources, decreasing signaling overhead in sidelink mini-slots, and improving user experience.

Figure 2:
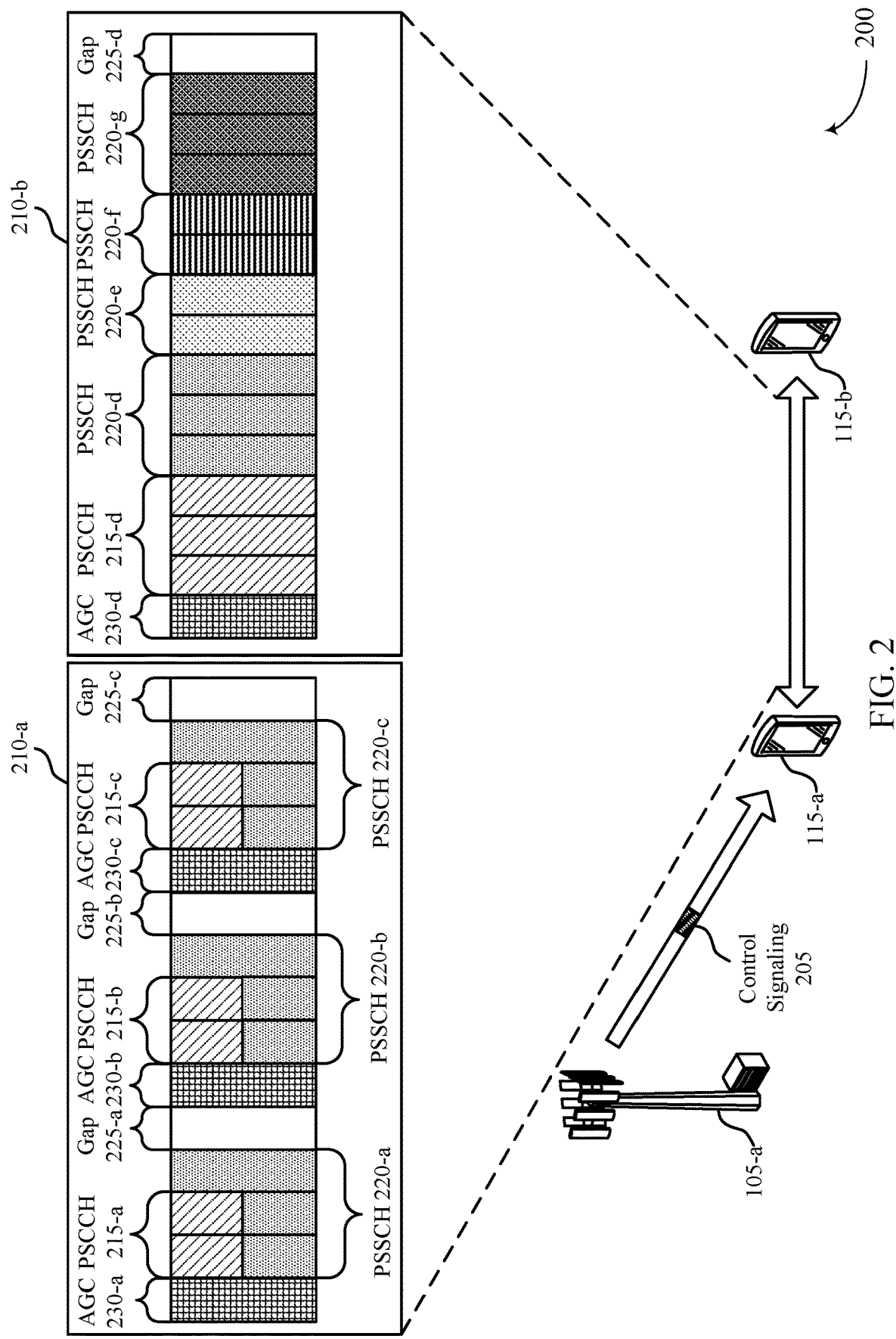

FIG. 2 illustrates an example of a wireless communications system 200 that supports techniques for sidelink mini-slot assignment and use in accordance with one or more aspects of the present disclosure. The wireless communications system 200 may implement, or be implemented by, aspects of the wireless communications system 100. For example, the wireless communications system 200 may include a network entity 105-a, a UE 115-a, and a UE 115-b, which may be examples of corresponding network entities 105 and UEs 115 described herein with reference to FIG. 1.

In some cases, the UE 115-a and the UE 115-b may communicate over a sidelink channel. In such cases, the network entity 105-a may transmit to the UE 115-a and UE 115-b control signaling 205 indicating a shared resource pool configured for sidelink communications. The UE 115-a may reserve one or more sidelink resources (e.g., within one or more sidelink slots) and may indicate the reserved sidelink slots to the UE 115-b via SCI over a PSCCH 215. The UE 115-a may transmit one or more TBs to the UE 115-b via a PSSCH 220 in the reserved sidelink slot. Additionally, the UE 115-b may also reserve one or more sidelink slots to transmit one or more TBs to the UE 115-a.

To reduce scheduling and turn-around time for sidelink communications, the UE 115-a and the UE 115-b may perform mini-slot scheduling according to a mini-slot scheme 210-a. For example, each sidelink slot may be split into multiple mini-slots (e.g., a mini-slot may be referred to as a sub-slot), where each mini-slot has a PSCCH 215 and a PSSCH 220. In the example of mini-slot scheme 210-a, a sidelink slot may be split into two mini-slots, where each mini-slot incudes four symbols (e.g., OFDM symbols). The first symbol of the sidelink slot may be allocated to an automatic gain control symbol (AGC) such as AGC 230-a, AGC 230-b, and AGC 230-c, which may be used to adjust the strength of the received signal. The remaining symbols of the mini-slot may be allocated for a PSCCH 215 and a PSSCH 220. For example, a portion of frequency resources within the second and third symbol of the mini-slot may be allocated for a PSCCH 215, while the remaining frequency portion of the second and third symbols and the fourth symbol may be allocated for a PSSCH 220. In some examples, the UE 115-a may indicate to the UE 115-b, via SCI over a PSCCH 215-a, a reservation of a PSSCH 220-a. Thus, the UE 115-a may transmit sidelink signaling (e.g., one or more TBs) to the UE 115-b via the PSSCH 220-a. Further, the UE 115-b may indicate to the UE 115-a, via SCI over a PSCCH 215-b, a reservation of a PSSCH 220-b. The UE 115-b may transmit sidelink signaling to the UE 115-a via the PSSCH 220-b. In some cases, a third UE 115 may indicate to the UE 115-a and the UE 115-b, via SCI over a PSCCH 215-c, a reservation of the PSSCH 220-c. The third UE 115 may transmit sidelink signaling to the UE 115-a, the UE 115-b, or both via the PSSCH 220-c. Thus, each mini-slot may be self-schedulable and self-decodable by one or more UEs 115.

Such communications via sidelink mini-slots, however, may cause one or more gaps 225 (e.g., a symbol that is unused in the mini-slot). That is, for the UE 115-a to transmit sidelink signaling in the PSSCH 220-a and receive sidelink signaling in the PSSCH 220-b, a gap 225-a, gap 225-b, and gap 225-c may be allocated in the sidelink slot for the UE 115-a to switch from transmitting to receiving. As the quantity of mini-slots increase per sidelink slot, which may enhance scheduling latency and be suitable for small packets (e.g., 32B for industrial IoT (IIoT) deployments), more symbols may be allocated as gaps 225. Thus, if a large quantity of UEs 115 are to be supported for mini-slot communications, such overhead may degrade the latency reduction gains. That is, as the quantity of UEs 115 using the mini-slot increases, an increased quantity of gaps 225 may be allocated (e.g., to enable multiple UEs 115 to switch from transmitting to receiving) leading to an increase in scheduling latency and turn-around time for sidelink communications.

To reduce gaps and maintain the reduced scheduling latency and turn-around time, the UEs 115 may use mini-slot scheme 210-b. In some sidelink communications systems, the gaps 225 may be allocated for a UE 115 to switch between transmitting and receiving. In such communications (e.g., if a UE 115 supports switching between transmitting and receiving at the sidelink slot boundaries), a gap 225 may be allocated at end of a sidelink slot. Such scenarios may similarly support the mini-slot scheme 210-b, which may include a gap 225-d at the end of the sidelink slot. Further, in mini-slot scheme 210-b, each sidelink slot may be split into multiple mini-slots according to a given pattern, duration for each mini-slot, and quantity of mini-slots per sidelink slot.

For example, the sidelink slot may be split into multiple mini-slots with varying durations (e.g., spanning various quantities of symbols). In such examples, the first portion of the sidelink slot may be allocated for the PSCCH 215-d and the AGC 230-d, while the subsequent mini slots may be allocated for one or more data transmissions over PSSCHs 220 (e.g., including PSSCH 220-d, PSSCH 220-e, PSSCH 220-f, and PSSCH 220-g). Thus, as described herein, the UE 115-a may transmit SCI (e.g., SCI1 of a two stage SCI) at the beginning of each slot via the PSCCH 215-d and indicate a reservation of a quantity of mini-slots in the same sidelink slot or future sidelink slots. Further, one or more UEs 115 may reserve one or more mini-slots within the sidelink slot for sidelink communications with other UEs 115. For instance, the UE 115-a may reserve the mini-slot associated with the PSSCH 220-d to transmit sidelink signaling to the UE 115-b, while the UE 115-b may reserve the mini-slot associated with the PSSCH 220-e to transmit sidelink signaling to the UE 115-a. Thus, one or more UEs 115 may use the mini-slot scheme 210-b to transmit and receive data transmissions.

In some cases, the first symbol of a sidelink slot may be allocated as an AGC 230-d, which may be used to adjust the strength of the received signal. In cases of mini-slot scheme 210-b, an AGC 230-d may not be used because the receiver can set the AGC based on the first symbol of the slot and use the same setting for the reception of any of the signaling via PSSCH 220 mini-slots.

In some examples of sidelink scheduling techniques (e.g., in vehicle-to-everything (V2X) systems, the UE 115-a may reserve resources on a sidelink slot basis. For example, the UE 115-a may indicate to the UE 115-b, via a PSCCH 215, reserved resources at the current sidelink slot and up to two subsequent sidelink slots (e.g., the UE 115-a may reserve up to three sidelink slots for sidelink communications within a threshold number of slots, such as thirty-one slots, as described in greater detail with reference to FIG. 3). In a mini-slot scenario, the UE 115-a may indicate resources to the UE 115-b for multiple PSSCHs 220 within a sidelink slot, which could, in some cases, result in large number of bits to indicate the reserved mini-slots and the resources utilized per mini-slot. In other words, to use the mini-slot scheme 210-b, the UE 115-a may indicate a reservation of multiple PSSCHs 220 within a sidelink slot, resulting in increased signaling overhead, increased latency, and an inefficient use of resources.

In some implementations, as described herein, the UE 115-a may indicate the reserved sidelink mini-slots to one or more UEs 115, such that the one or more UEs 115 may determine whether or not the mini-slots in a sidelink slot are reserved (e.g., without a significant increase in signaling overhead). For example, the UE 115-a and the UE 115-b may receive control signaling 205 indicating a shared sidelink resource pool, a threshold quantity of mini-slots (e.g., three mini-slots) that may be reserved within a given slot, and a sidelink transmission mode of operation. In some examples, the UE 115-a may transmit SCI, via the PSCCH 215-d, in the first portion of a sidelink slot indicating a reservation of up to the threshold quantity of mini-slots within the sidelink slot (e.g., up to three mini-slots). The UE 115-a may use the reserved mini-slots to transmit sidelink signaling according to the sidelink transmission mode of operation. For example, in a first sidelink transmission mode of operation, the UE 115-a may transmit a TB via the PSSCH 220-d and retransmit the TB in the PSSCH 220-e and the PSSCH 220-f of the sidelink slot. In a second sidelink transmission mode of operation, the UE 115-a may transmit different TBs in each reserved mini-slot. For example, the UE 115-a may transmit to the UE 115-b a first TB in the PSSCH 220-d, a second TB in the PSSCH 220-e, and a third TB in the PSSCH 220-f. The mode of operation may be indicated via the control signaling, or may be negotiated between the UE 115-a and the UE 115-b (e.g., via sidelink RRC signaling, or sidelink MAC-CE signaling, among other examples).

In some implementations, the UE 115-a may transmit SCI in the first portion of the sidelink slot indicating a reservation of up to the threshold quantity of mini-slots within the sidelink slot, as well as a reservation of one or more additional sidelink slots for repetitions of the reserved mini-slots. In some examples, the UE 115-a may indicate the reserved mini-slot via an indication of reserved resources, or via a bitmap. In some examples, if the UE 115-a reserves resources having different sizes across mini-slots, then the UE 115-a may perform sequential reservation (e.g., may reserve a first mini-slot in a first SCI message in the PSCCH 215-d, and may then reserve a second mini-slot via a second SCI message, such as an SCI-2 message, in the first reserved mini-slot). Additionally, the UE 115-a may indicate the received sidelink transmission mode of operation to one or more UEs 115 via the SCI. Thus, the UE 115-a may reserve one or more mini-slots via the PSCCH 215-d in the first portion of sidelink slot and transmit sidelink signaling via the PSSCHs 220, thereby reducing the inefficient use of sidelink resources, decreasing signaling overhead in sidelink mini-slots, and improving user experience.

Figure 3:
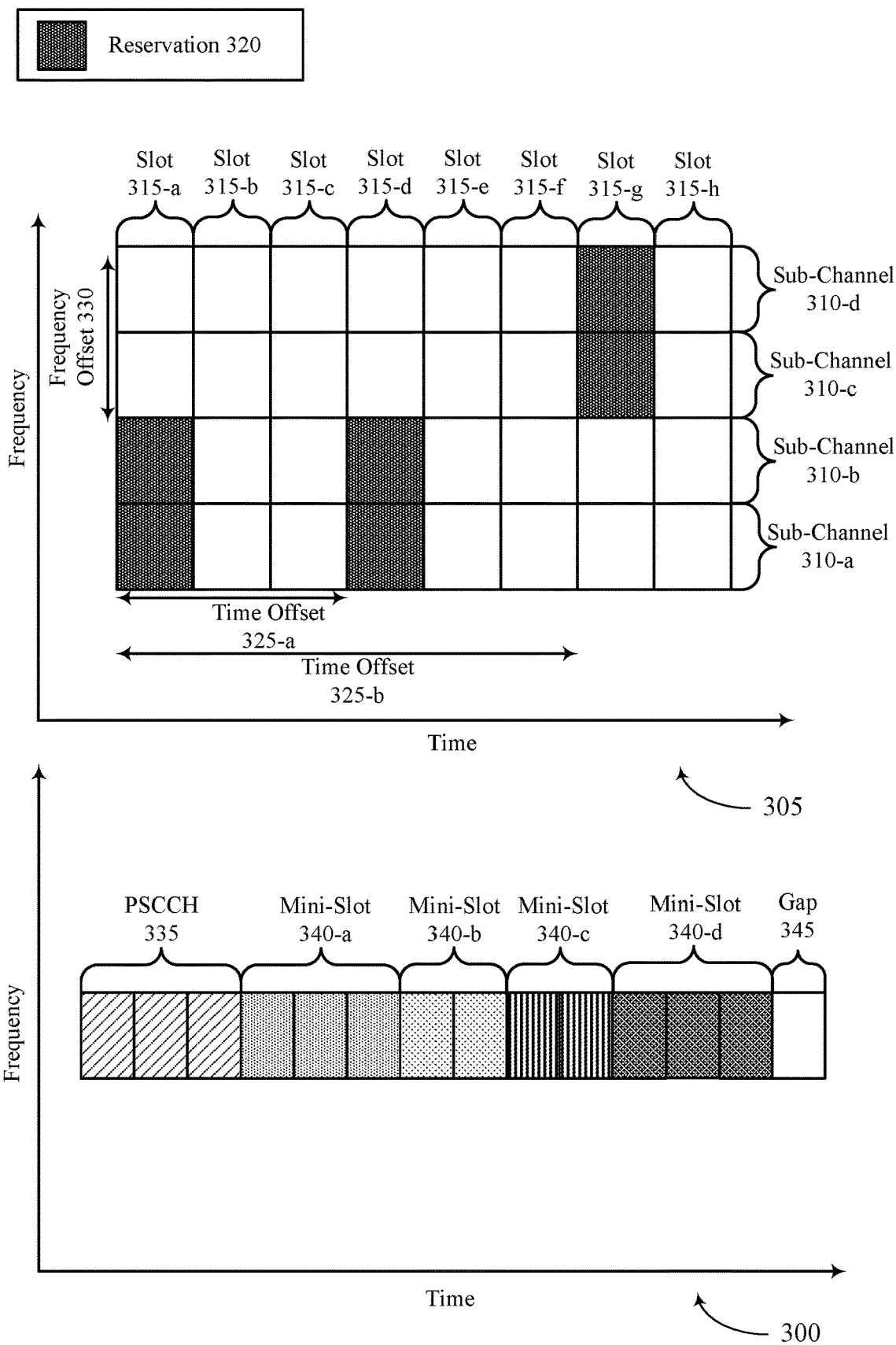
FIG. 3 illustrates an example of a mini-slot reservation scheme that supports techniques for sidelink mini-slot assignment and use in accordance with one or more aspects of the present disclosure.

FIG. 3 illustrates an example of a mini-slot reservation scheme 300 that supports techniques for sidelink mini-slot assignment and use in accordance with one or more aspects of the present disclosure. FIG. 3 also illustrates an example of a slot reservation scheme 305 that supports techniques for sidelink mini-slot assignment and use in accordance with one or more aspects of the present disclosure. The mini-slot reservation scheme 300 may implement, or be implemented by, aspects of the wireless communications system 100 and the wireless communications system 200 with reference to FIGS. 1 and 2. For example, the mini-slot reservation scheme 300 may be implemented by a UE 115, which may be an example of a UE 115 described herein with reference to FIGS. 1 and 2.

The UE 115-a may communicate with one or more UEs 115 via one or more sidelink slots. One or more UEs may reserve frequency resources (e.g., sub-channels 310, including sub-channel 310-a, sub-channel 310-b, sub-channel 310-c, and sub-channel 310-d), time resources (e.g., one or more slots 315, including slot 315-a, slot 315-b, slot 315-c, slot 315-d, slot 315-e, slot 315-f, slot 315-g, and slot 315-h) according to sidelink slot scheme 305.

In some examples of slot-based sidelink resource reservation, the UE 115 may reserve resources for up to a threshold quantity of reservations (e.g., up to three reservations) for transmission of sidelink data, where the threshold quantity of reservations may be preconfigured at the UE 115 (e.g., via higher layer signaling), as described herein with reference to FIG. 1. For example, the UE 115 may reserve resources in the slot 315-a, the slot 315-d, and the slot 315-g, where each reserved slot is separated by a time offset 325 (e.g., three slots 315). In some examples, the reservation for slot 315-d and slot 315-g may be defined with reference to a time offset from the slot 315-a. In some cases, the UE 115 may reserve sidelink slots that cover more than one sub-channel 310. For example, the UE 115-a may reserve resources in the slot 315-a that span a sub-channel 310-a and a sub-channel 310-b. Likewise, the UE 115 may reserve additional resources, such as resources in the slot 315-d, that also span the sub-channel 310-a and the sub-channel 310-b. Thus, the UE 115 may reserve future sidelink slots, separated according to the time offset 325-a, that are for the same quantity of sub-channels 310.

Additionally, or alternatively, the starting sub-channel 310 may differ between reservations 320 according to a frequency offset 330 (e.g., two sub-channels 310). For example, the reserved resources in slot 315-a and slot 315-d may span the same sub-channels (e.g., sub-channel 310-a and sub-channel 310-b). However, the UE 115 may reserve resources in the slot 315-g that span the sub-channel 310-c and the sub-channel 310-d according to the frequency offset 330. Thus, the UE 115 may reserve up to the threshold quantity of sidelink slots according to the time offsets 325 and the frequency offset 330.

The UE 115 may transmit an indication of the reservations 320 to one or more sidelink UEs via SCI signaling. The SCI may indicate a reservation index, quantity of sub-channels 310 used in each reservation, and one or more time offsets 325 used in each reservation as shown in table 1.

TABLE 1

| SCI Reservations | | |
|---|---|---|
| Reservation | Quantity of Sub-Channels 310 | Slot |
| 1 | 2 | i |
| 2 | 2 | i + x: 0 < x ≤ 31 |
| 3 | 2 | i + y: x < y ≤ 31 |

The variable T may indicate the starting slot 315-a. The variable 'x' may indicate the time offset 325-a (e.g., such that slot 315-a plus three slots 315 equals a starting of slot 315-d). The variable 'y' may indicate the time offset 325-b (e.g., such that slot 315-a plus six slots 315 equals a starting of slot 315-g). Additionally, the UE 115 may indicate the frequency offset 330 (e.g., not shown in table 1) to the one or more UEs 115. In some cases, the reservations 320 indicated in the SCI may be repeated according to a signaling period, when enabled. That is, the UE 115 may reserve sidelink slots according to a specific periodicity. Thus, in examples of slot-based sidelink resource reservations, the UE 115-a may receive control signaling which indicates a threshold number of reservations (e.g., 3 reservations) that can be located up to a number of slots away (e.g., up to 31 slots). The UE 115 may then transmit SCI indicating up to three reservations 320 (e.g., in three distinct slots).

To reduce scheduling latency and improve turn-around time in sidelink communications, the UE 115 may implement a mini-slot reservation scheme 300 within slots 315. The mini-slot reservation scheme 300 may be an example of a mini-slot scheme 210-*b* as described herein with reference to FIG. 2. For example, the mini-slot scheme may include a first mini-slot 340 allocated for a PSCCH 335. The mini-slot 340-*a*, mini-slot 340-*b*, mini-slot 340-*c*, and mini-slot 340-*d* may be allocated for data transmissions over a PSSCH. The gap 345 may be allocated to enable the UE 115 to switch from transmitting to receiving. However, as described in FIG. 2, to use a mini-slot reservation scheme 300, the UE 115 may indicate a reservation for each mini-slot within a slot 315 via SCI, which may increase signaling overhead and reduce the scheduling latency gains.

Thus, to reduce signaling overhead for the use of mini-slots, the UE 115 may schedule mini-slots via SCI, and a receiving UE 115 may interpret the received SCI (e.g., indicating up to a threshold number of mini-slots, instead of the threshold number of slots), according to a limitation of having all reserved transmissions scheduled on a same slot 315, which may limit the time offsets 325 to local mini-slots 340 within a slot 315. For example, the UE 115 may receive control signaling indicating a shared resource pool for sidelink communication. The control signaling may be a resource pool level configuration that includes a threshold quantity of mini-slot reservations for the UE 115. In order to leverage existing SCI formats (e.g., a same SCI format used for slot-level sidelink resource reservations), the threshold quantity of mini-slot reservations may be set to three. In such cases, for the UE 115 to reserve up to the threshold quantity of mini-slot reservations in the SCI, the UE 115 may define the frequency resource assignment bits as $$\left\lceil \log_2\left(\frac{N^{SL}_{subChannel}(N^{SL}_{subChannel}+1)(2N^{SL}_{subChannel}+1)}{6}\right)\right\rceil.$$

In cases of a large quantity of sub-channels 310, the UE 115 may define the frequency resource assignment bits to be approximately $$\left\lceil 3\log_2\left(\frac{N^{SL}_{subChannel}}{3}\right)\right\rceil.$$

Thus, the UE 115 may reserve mini-slot 340-*a*, mini-slot 340-*b*, and mini-slot 340-*c*.

In some examples, a UE may use a few mini-slots within a set of mini-slots configured within a slot. In such examples, the UE may indicate which mini-slots it is using (e.g., is reserving for current of subsequent sidelink communications) and may signal the mini-slot resource allocation to one or more sidelink UEs. The UE may include, in scheduling SCI messages, information indicating the reserved mini-slots within a given one or more slots. Such information may include a bitmap, which may indicate which mini-slots 340 within a slot the UE is using (e.g., such a bitmap may reduce interference between UEs). In some examples, the UE may include, in the scheduling SCI messages, an indication of reserved resources for each mini-slot (e.g., which may be the same size, or different sizes).

The UE 115 may indicate the reserved mini-slots 340 (e.g., mini-slot 340-*a*, mini-slot 340-*b*, and mini-slot 340-*c*) to one or more UEs 115 via SCI signaling. For example, the UE 115 may transmit SCI signaling (e.g., SCI-1), via the PSCCH 335, indicating the total resource (e.g., time and frequency) allocation of all reserved mini-slots 340 (e.g., SCI-1 indicates all resources used by the UE 115). The total quantity of resources may be indicated via a bitmap, or via explicit indications (e.g., offsets, indices, etc.) indicating time and frequency resources of reserved mini-slots 340. In some implementations, the UE 115 may transmit a bitmap, via the SCI signaling, indicating which mini-slots 340 within a slot 315 are reserved, thereby reducing interference between one or more receiving UEs 115. For example, the UE 115 may reserve mini-slots 340 that are within the same sub-channel 310 (e.g., UE 115 may operate in a mode where all mini-slots 340 operate within the same sub-channel 310), are of the same duration (e.g., equal quantity of symbols allocated to each mini-slot 340), or both. Thus, the UE 115 may signal, via SCI, a bitmap to indicate which mini-slots 340 may be utilized by the UE 115 (e.g., the selected subset of mini-slots 340 within the slot 315), the duration of a mini-slot 340 (e.g., because all mini-slots 340 have the same duration or span the same frequency resources of a single sub-channel), time and frequency resource allocation of the mini-slots 340, the beginning sub-channel 310 of the reserved mini-slots, or any combination thereof. In some examples, the SCI (e.g., the bitmap) may indicate the mini-slot indices (e.g., the exact mini-slot indices) of reserved mini-slots 340. The quantity of ones within the bitmap may be a function of the threshold quantity of mini-slot reservations within a resource pool. For example, to indicate a reservation of the mini-slot 340-*a* and the mini-slot 340-*d*, the UE 115 may indicate a bitmap with a value of 1001 to one or more UEs 115 (e.g., for a threshold quantity of reservations equal to four).

In some implementations, the reserved resources for each mini-slot 340 may have different durations (e.g., spanning various quantities of symbols per mini-slot 340), may span different frequency ranges (e.g., different numbers of sub-channels or portions of sub-channels), or both. In some examples, all reserved resources may be the same size. In cases, if different resource sizes are allocated across the various mini-slots 340, the UE 115 may perform sequential signaling (e.g., sequential indication) to indicate the reservation of mini-slots 340. In such examples, a first SCI message (e.g., an SCI-1) may include all information for a first reserved mini-slot 340 (e.g., but may not include any reservation information for a second mini-slot 340), and resource allocation of a mini-slot x may be signaled in a second SCI message (e.g., an SCI-2) of a mini-slot x−1. For example, the UE 115 may transmit SCI-1, via the PSCCH 335, indicating a reservation of mini-slot 340-*a*. The UE 115 may transmit, via a PSSCH in mini-slot 340-*a*, SCI-2 indicating a reservation of the mini-slot 340-*b*. Similarly, the UE 115 may transmit, via a PSSCH in mini-slot 340-*b*, SCI-2 indicating a reservation of the mini-slot 340-*c*. Thus, the receiving UEs 115 may decode the SCI-2 to get the source and destination IDs for the sidelink signaling transmitted in the reserved mini-slots 340. In such implementations, the UE 115 may transmit the SCI-2 including reservation information for subsequent mini-slots 340 in addition to the sidelink signaling in the PSSCH of the reserved mini-slots. In some cases, the UE 115 may transmit, via the SCI signaling, mini-slot indexes or identifications.

Further, the UE 115 may transmit sidelink signaling according to a sidelink transmission mode of operation on the reserved mini-slots 340. In a first sidelink transmission mode of operation each mini-slot 340 may be used for a transmitting separate TBs. In a second sidelink transmission mode of operation, a first mini-slot 340 may be used for a TB, and a second and third mini-slot 340 may be used for retransmitting the TB. The UE 115 may receive the sidelink transmission mode of operation may via the control signaling, may negotiate the mode of operation with the other sidelink UEs, or may indicate the sidelink transmission mode of operation to one or more UEs 115 via stage one or two SCI, or any combination thereof. In some examples, one or more sidelink UEs 115 may agree on a sidelink transmission mode of operation via PC5-RRC signaling, sidelink MAC-CE signaling, or both.

In some cases, the UE 115 may reserve an increased quantity of mini-slots 340 (e.g., more than three mini-slots). In such cases, the UE 115 may transmit an SCI according to an SCI format according to a radio network temporary identifier (RNTI) associated with the SCI format, or according to configuration information received via the network entity 105 or another UE 115, such that the UE 115 may indicate the increased quantity of reserved resources and indicate the sidelink transmission mode of operation (e.g., transmitting a same TB across a reserved set of mini-slots, or transmitting different TBs across another set of mini-slots) in the SCI (e.g., SCI-1). Additionally, using such an SCI format, the UE 115 may reserve multiple mini-slots 340 within a sidelink slot 315 via the SCI, as well as indicate in the SCI one or more subsequent sidelink slots 315 in which the UE 115 reserves the same pattern of mini-slots. For example, the UE 115 may reserve mini-slot 340-*a*, and mini-slot 340-*c*, and mini-slot 340-*d* in a first slot, and may further indicate in the SCI one or more time offsets 325, frequency offsets 330, or both, indicating one or more subsequent slots 315 in which the UE 115 may also reserve a respective mini-slot 340-*a*, mini-slot 340-*c*, and mini-slot 340-*d*. For example, the UE 115 may indicate the time offsets 325 and the frequency offsets 330 for the retransmission of the mini-slots 340 in a slot 315-*d* via SCI transmitted in slot 315-*a* (e.g., the current slot 315).

Thus, as described herein, the UE 115 may receive control signaling indicating a shared resource pool for sidelink communications. The control signaling may indicate the threshold quantity of mini-slot reservations and the sidelink transmission mode of operation. In some examples, the threshold quantity of mini-slot reservations may be a threshold of three mini-slot reservations, in which case the UE 115 may interpret an SCI format that is similar to or the same as an SCI format used for slot-level sidelink resource reservations. In some examples, the threshold quantity of mini-slot reservations may be less than or greater than three mini-slots, and the SCI may include reservation information for each indicated mini-slot (e.g., via a bitmap, an indication of indices or offsets, or any combination thereof). The UE 115 may transmit SCI signaling, via the PSCCH 335 in the first portion of the slot 315, reserving the mini-slot 340-*a*, the mini-slot 340-*b*, and the mini-slot 340-*c* to one or more UEs 115. In some cases, the UE 115 may indicate the reserved mini-slots 340 via a bitmap, within the SCI signaling. For example, the bitmap may indicate that the mini-slot 340-*a*, the mini-slot 340-*b*, and the mini-slot 340-*c* are reserved (e.g., 0111).

In some other cases, the UE 115 may use sequential signaling to reserve the mini-slots 340. For example, the UE 115 may transmit a first SCI, such as an SCI-1, via the PSCCH 335, indicating a reservation for the mini-slot 340-*a*. The UE 115 may transmit, within the mini-slot 340-*a*, a second stage SCI, such as SCI-2, indicating a reservation of mini-slot 340-*b* over a PSSCH. The UE 115 may transmit sidelink signaling to one or more receiving UEs 115 via the reserved mini-slots according to the sidelink transmission mode of operation. In the first sidelink transmission mode of operation, the UE 115 may transmit a TB via a PSSCH in the mini-slot 340-*a* and retransmit the TB via PSSCHs in the mini-slot 340-*b* and the mini-slot 340-*c* respectively. In the second sidelink transmission mode of operation, the UE 115 may transmit a first TB via a PSSCH in the mini-slot 340-*a*, a second TB via a PSSCH in the mini-slot 340-*b*, and a third TB via a PSSCH in the mini-slot 340-*c*.

Figure 4:
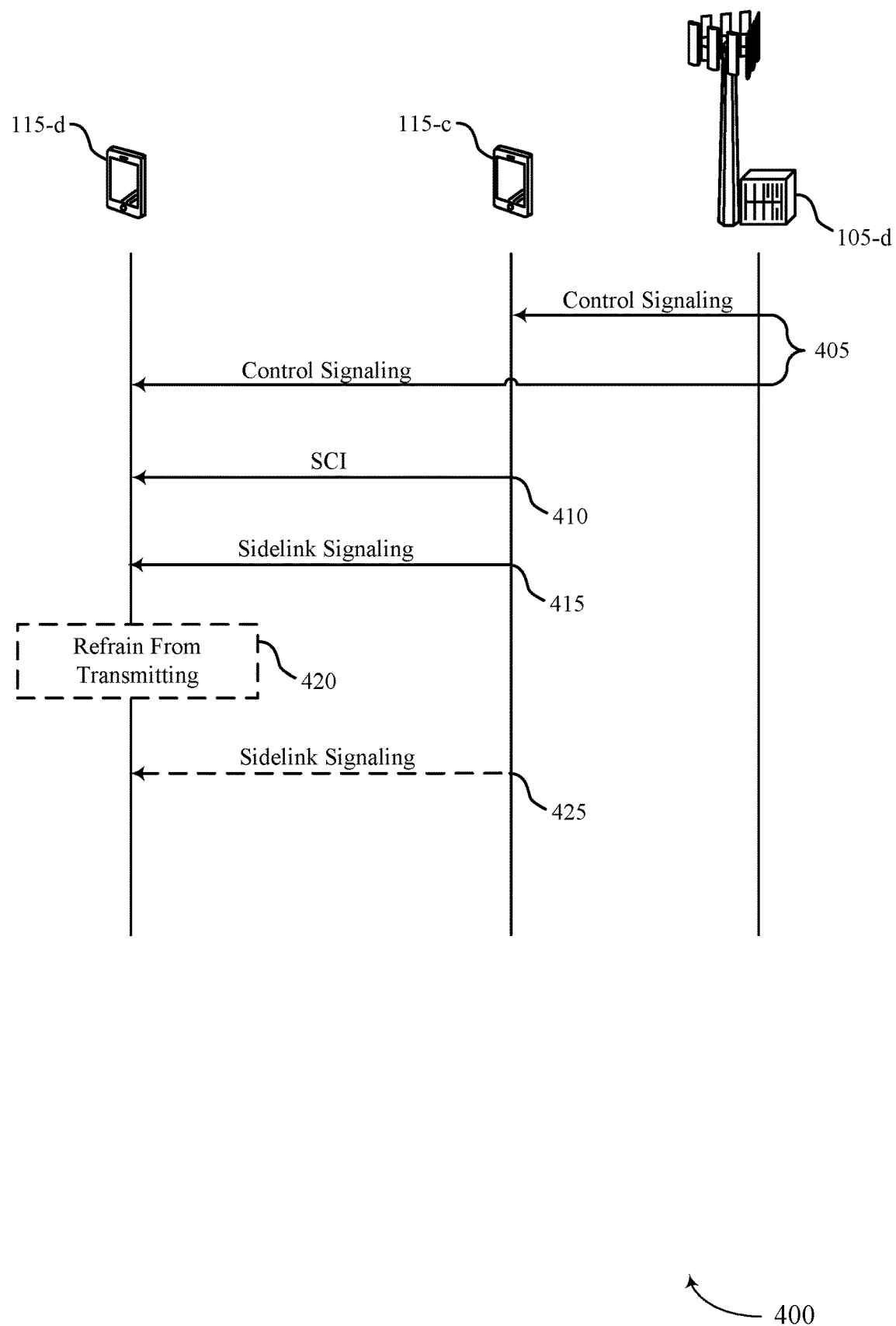
FIG. 4 illustrates an example of a process flow that supports techniques for sidelink mini-slot assignment and use in accordance with one or more aspects of the present disclosure.

FIG. 4 illustrates an example of a process flow 400 that supports techniques for sidelink mini-slot assignment and use in accordance with one or more aspects of the present disclosure. The process flow 400 may implement, or be implemented by, aspects of the wireless communications system 100, the wireless communications system 200, and the mini-slot reservation scheme 300 as described herein with reference to FIGS. 1 through 3. For example, the process flow 400 may include a network entity 105-*d*, a UE 115-*c*, and a UE 115-*d*, which may be examples of corresponding devices described herein with reference to FIGS. 1 through 3. In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time.

At 405, the UE 115-*c* and the UE 115-*d* may receive control signaling indicating a set of sidelink shared resources of a sidelink shared resource pool, a threshold quantity of mini-slot reservations for the set of sidelink shared resources, an indication of a sidelink transmission mode of operation associated with mini-slots, or a combination thereof. In some cases, the set of sidelink shared resources may include multiple slots, where each slot of the sidelink shared resources includes multiple mini-slots.

At 410, the UE 115-*c* may transmit SCI including a reservation of a set of mini-slots of a first slot, where the quantity of the set of mini-slots satisfies the threshold quantity of mini-slot reservations. The reservation of the set of mini-slots may include a bitmap indicating the set of mini-slots (e.g., if the mini-slots are reserved on a same sub-channel), or an indication of time resources, frequency resources, or both for each mini-slot of the set of mini-slots (e.g., if the mini-slots are reserved on different sub-channels, or include different amounts (e.g., quantities) of time or frequency resources (e.g., are different sizes). For example, the UE 115-*c* may transmit, in a PSCCH of a first mini-slot, SCI indicating a reservation for multiple mini-slots within the same sidelink slot. In some implementations, the UE 115-*c* may include an indication of the sidelink transmission mode of operation in the SCI. In some other implementations, the UE 115-*c* and the UE 115-*d* may negotiate the sidelink transmission mode of operation via PC5-RRC signaling, MAC-CE signaling, or both. In some cases, the UE 115-*c* and the UE 115-*d* may negotiate the sidelink transmission mode in addition to receiving the control signaling indicating the sidelink transmission mode. In some other cases, the UE 115-*c* and the UE 115-*d* may negotiate the sidelink transmission mode of operation instead of receiving an indication within the control signaling.

In the case of sequential signaling, the UE 115-*c* may transmit, and the UE 115-*d* receive, a first SCI including an indication of a first mini-slot and transmit, within the first mini-slot, a second SCI including an indication of a second mini-slot. In such cases, the first mini-slot may include a first quantity of sidelink shared resources, and the second mini-slot may include a second quantity of sidelink shared resources different that than the first quantity. For example, the UE 115-c may transmit a first stage SCI indicating a first mini-slot and transmit (e.g., at 415), within the first mini-slot, a second stage SCI indicating a second reserved mini-slot.

In some cases, the UE 115-c may reserve an increased quantity of mini-slots (e.g., more than three mini-slots). In such cases, the UE 115-c may transmit an SCI according to an SCI format according to a radio network temporary identifier (RNTI) associated with the SCI format, or according to configuration information received via the network entity 105-d or another UE 115, such that the UE 115-c may indicate the increased quantity of reserved resources and indicate the sidelink transmission mode of operation in the SCI (e.g., SCI-1). Further, the UE 115-c may indicate a reservation of a set of slots for retransmissions of the first set of mini-slots in the SCI signaling. For example, the UE 115-c may reserve multiple mini-slots within a sidelink slot via the SCI, as well as indicate in the SCI one or more subsequent sidelink slots in which the UE 115-c reserves the same pattern of mini-slots. In such cases, the UE 115-c may include the time offsets and frequency offsets for the retransmission of mini-slots within the subsequent sidelink slots in the SCI, where the offsets may be fixed across all mini-slots. In some cases, the offsets may be different from one mini-slot to another mini-slot. For example, in the example of mini-slot reservation scheme 300 described herein with reference to FIG. 3, the UE 115-c may reserve mini-slot 340-a, and mini-slot 340-c, and mini-slot 340-d in a first slot, and may further indicate in the SCI one or more time offsets, frequency offsets, or both, indicating one or more subsequent slots in which the UE 115-c also reserves a respective mini-slot 340-a, mini-slot 340-c, and mini-slot 340-d.

At 415, the UE 115-c may transmit, and the UE 115-d receive, sidelink signaling via the set of mini-slots according to the sidelink transmission mode of operation. For example, in a first sidelink transmission mode of operation, the UE 115-c may transmit a first TB via a first mini-slot and transmit a second TB via a second mini-slot. In some other examples, the UE 115-c may transmit a first transport block via each reserved mini-slot. That is, the UE 115-c may transmit a first TB in a first mini-slot and retransmit the first TB in a second and third mini-slot.

At 420, the UE 115-d may optionally refrain from transmitting sidelink signaling via the set of mini-slots within the slot based on the reservation of the set of mini-slots. That is, the UE 115-d may receive the SCI signaling indicating a reservation of the set of mini-slots and refrain from transmitting sidelink data based on the indicated reservation. At 425, the UE 115-c may retransmit sidelink signaling via the set of mini-slots within each slot of the set of slots according to the indication of the set of slots. For instance, the UE 115-c may transmit sidelink signaling via mini-slots in a first slot at 415 and transmit sidelink signaling via mini-slots in a second and third slot according to the reservation of future slots at 410.

Figure 5:
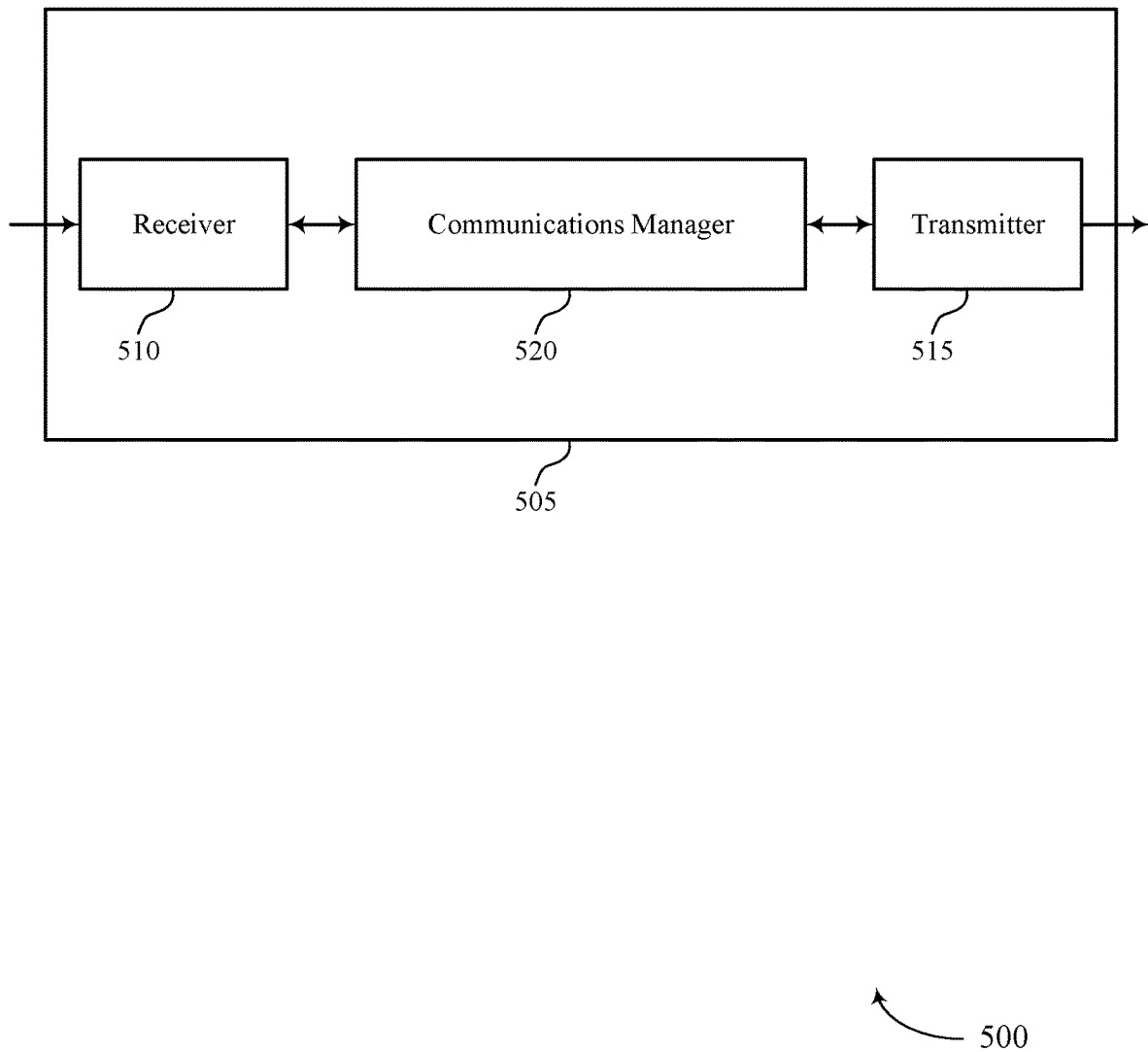
FIGS. 5 and 6 show block diagrams of devices that support techniques for sidelink mini-slot assignment and use in accordance with one or more aspects of the present disclosure.

FIG. 5 shows a block diagram 500 of a device 505 that supports techniques for sidelink mini-slot assignment and use in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for sidelink mini-slot assignment and use). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for sidelink mini-slot assignment and use). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for sidelink mini-slot assignment and use as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The communications manager 520 may be configured as or otherwise support a means for transmitting SCI including a reservation of a set of mini-slots of a first slot of the set of multiple slots, where a quantity of the set of mini-slots satisfies the threshold quantity of mini-slot reservations. The communications manager 520 may be configured as or otherwise support a means for transmitting sidelink signaling via the set of mini-slots according to a sidelink transmission mode of operation associated with the set of mini-slots.

Additionally, or alternatively, the communications manager 520 may support wireless communications at a UE in accordance with examples as disclosed herein. For example, the communications manager 520 may be configured as or otherwise support a means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The communications manager 520 may be configured as or otherwise support a means for receiving SCI including a reservation of a set of mini-slots of a first slot of the set of multiple slots, where a quantity of the set of mini-slots satisfies the threshold quantity of mini-slot reservations. The communications manager 520 may be configured as or otherwise support a means for performing sidelink communications via one or more of the set of multiple slots according to the reservation of the set of mini-slots.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for sidelink communications via one or more mini-slots resulting in more efficient utilization of communication resources.

Figure 6:
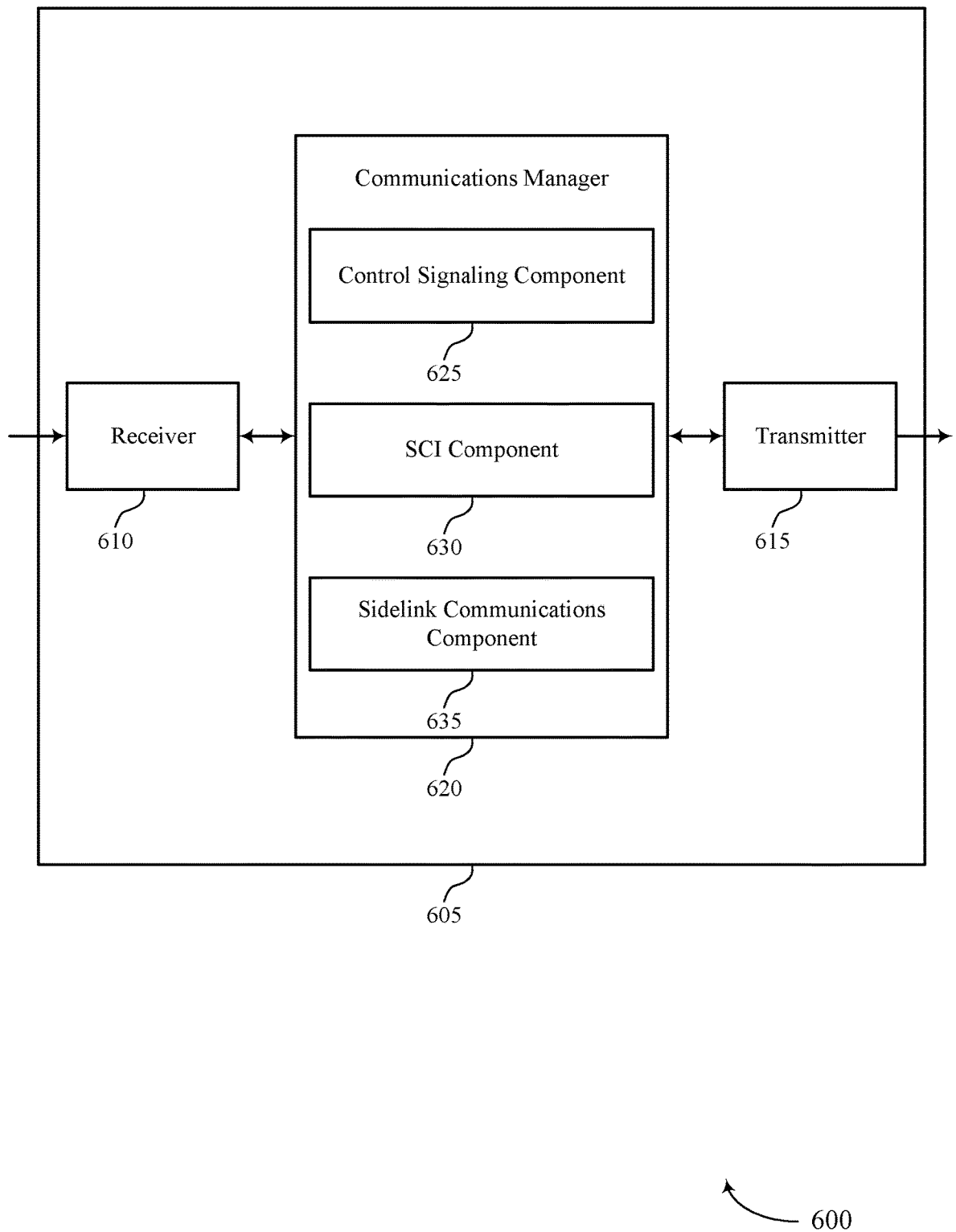

FIG. 6 shows a block diagram 600 of a device 605 that supports techniques for sidelink mini-slot assignment and use in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sidelink mini-slot assignment and use). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sidelink mini-slot assignment and use). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for sidelink mini-slot assignment and use as described herein. For example, the communications manager 620 may include a control signaling component 625, an SCI component 630, a sidelink communications component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The control signaling component 625 may be configured as or otherwise support a means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The SCI component 630 may be configured as or otherwise support a means for transmitting SCI including a reservation of a set of mini-slots of a first slot of the set of multiple slots, where a quantity of the set of mini-slots satisfies the threshold quantity of mini-slot reservations. The sidelink communications component 635 may be configured as or otherwise support a means for transmitting sidelink signaling via the set of mini-slots according to a sidelink transmission mode of operation associated with the set of mini-slots.

Additionally, or alternatively, the communications manager 620 may support wireless communications at a UE in accordance with examples as disclosed herein. The control signaling component 625 may be configured as or otherwise support a means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The SCI component 630 may be configured as or otherwise support a means for receiving a SCI including a reservation of a set of mini-slots of a first slot of the set of multiple slots, where a quantity of the set of mini-slots satisfies the threshold quantity of mini-slot reservations. The sidelink communications component 635 may be configured as or otherwise support a means for performing sidelink communications via one or more of the set of multiple slots according to the reservation of the set of mini-slots.

Figure 7:
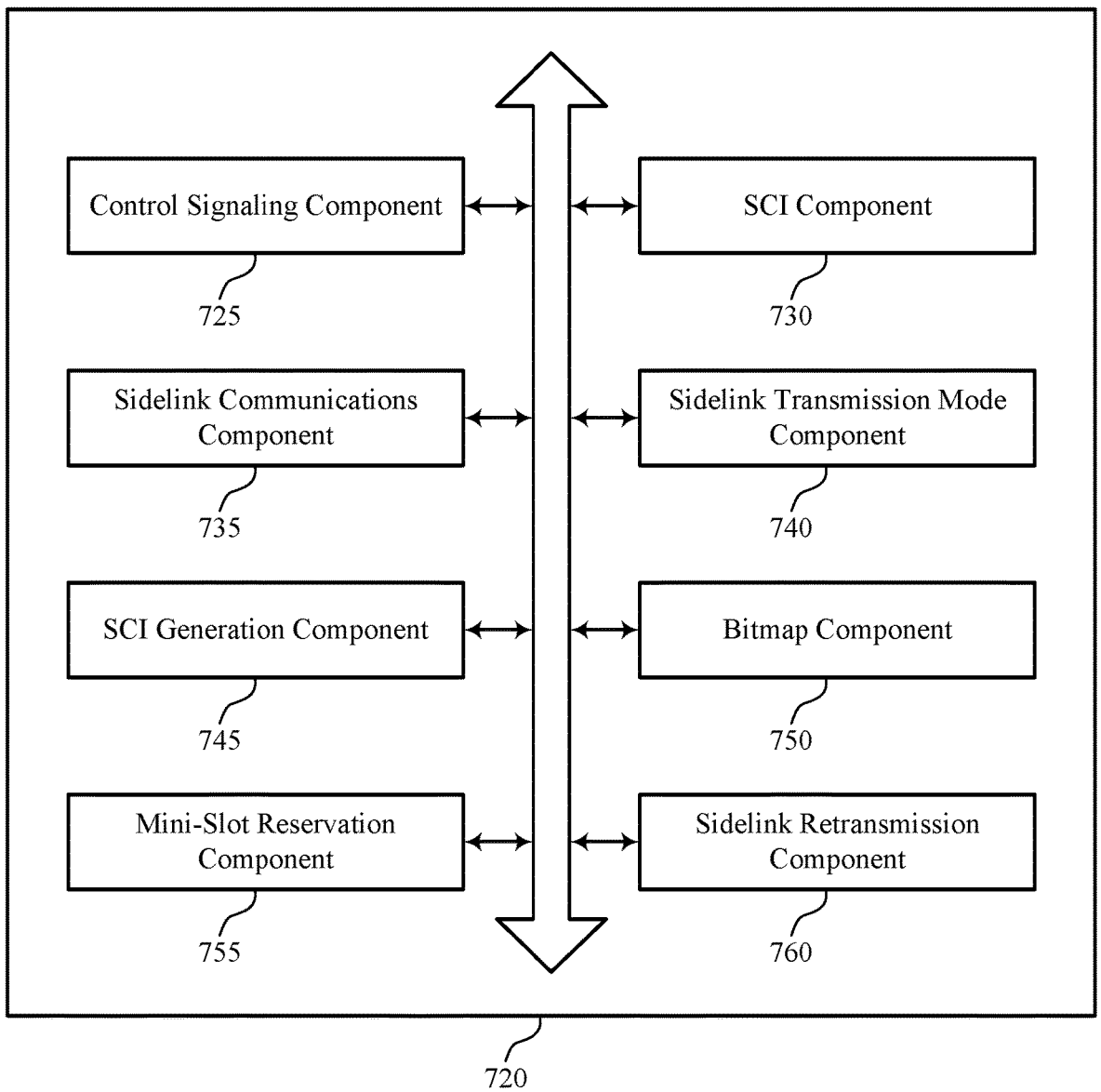
FIG. 7 shows a block diagram of a communications manager that supports techniques for sidelink mini-slot assignment and use in accordance with one or more aspects of the present disclosure.

FIG. 7 shows a block diagram 700 of a communications manager 720 that supports techniques for sidelink mini-slot assignment and use in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for sidelink mini-slot assignment and use as described herein. For example, the communications manager 720 may include a control signaling component 725, an SCI component 730, a sidelink communications component 735, a sidelink transmission mode component 740, an SCI generation component 745, a bitmap component 750, a mini-slot reservation component 755, a sidelink retransmission component 760, or any combination thereof. Each of these components may communicate, directly or indirectly, with one another (e.g., via one or more buses).

The communications manager 720 may support wireless communications at a UE in accordance with examples as disclosed herein. The control signaling component 725 may be configured as or otherwise support a means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The SCI component 730 may be configured as or otherwise support a means for transmitting a SCI including a reservation of a set of mini-slots of a first slot of the set of multiple slots, where a quantity of the set of mini-slots satisfies the threshold quantity of mini-slot reservations. The sidelink communications component 735 may be configured as or otherwise support a means for transmitting sidelink signaling via the set of mini-slots according to a sidelink transmission mode of operation associated with the set of mini-slots.

In some examples, the sidelink transmission mode component 740 may be configured as or otherwise support a means for receiving, in the control signaling, an indication of the sidelink transmission mode of operation, where transmitting the sidelink signaling is based on the indication of the sidelink transmission mode of operation.

In some examples, the sidelink transmission mode component 740 may be configured as or otherwise support a means for including, in the SCI, an indication of the sidelink transmission mode of operation, where transmitting the sidelink signaling is based on the indication of the sidelink transmission mode of operation.

In some examples, to support transmitting the sidelink signaling, the sidelink communications component 735 may be configured as or otherwise support a means for transmitting a first TB via a first mini-slot of the set of mini-slots according to the sidelink transmission mode of operations. In some examples, to support transmitting the sidelink signaling, the sidelink communications component 735 may be configured as or otherwise support a means for transmitting a second TB via a second mini-slot of the set of mini-slots according to the sidelink transmission mode of operations.

In some examples, to support transmitting the sidelink signaling, the sidelink communications component 735 may be configured as or otherwise support a means for transmitting a first TB via each mini-slot of the set of mini-slots according to the sidelink transmission mode of operations.

In some examples, the SCI generation component 745 may be configured as or otherwise support a means for including, in the SCI, an indication of a set of slots for retransmissions of the set of mini-slots of the first slot.

In some examples, the indication of the set of slots includes a set of time offsets, a set of frequency offsets, or both, each time offset, frequency offset, or both, is associated with a respective slot of the set of slots.

In some examples, the sidelink retransmission component 760 may be configured as or otherwise support a means for retransmitting the sidelink signaling via the set of mini-slots within each slot of the set of slots according to the indication of the set of slots.

In some examples, to support reservation of the set of mini-slots, the bitmap component 750 may be configured as or otherwise support a means for a bitmap indicating the set of mini-slots of the set of multiple mini-slots.

In some examples, to support reservation of the set of mini-slots, the mini-slot reservation component 755 may be configured as or otherwise support a means for an indication of time resources, frequency resources, or both, for each mini-slot of the set of mini-slots of the set of multiple mini-slots.

In some examples, to support transmitting the SCI, the sidelink communications component 735 may be configured as or otherwise support a means for transmitting a first SCI message including an indication of a first mini-slot of the set of mini-slots. In some examples, to support transmitting the SCI, the sidelink communications component 735 may be configured as or otherwise support a means for transmitting, in the first mini-slot of the set of mini-slots based on the first SCI message, a second SCI message including an indication of a second mini-slot of the set of mini-slots.

In some examples, the first mini-slot includes a first quantity of the set of sidelink shared resources and the second mini-slot includes a second quantity of the set of sidelink shared resources that is different from the first quantity of the set of sidelink shared resources.

Additionally, or alternatively, the communications manager 720 may support wireless communications at a UE in accordance with examples as disclosed herein. In some examples, the control signaling component 725 may be configured as or otherwise support a means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. In some examples, the SCI component 730 may be configured as or otherwise support a means for receiving a SCI including a reservation of a set of mini-slots of a first slot of the set of multiple slots, where a quantity of the set of mini-slots satisfies the threshold quantity of mini-slot reservations. In some examples, the sidelink communications component 735 may be configured as or otherwise support a means for performing sidelink communications via one or more of the set of multiple slots according to the reservation of the set of mini-slots.

In some examples, to support performing the sidelink communications, the sidelink communications component 735 may be configured as or otherwise support a means for receiving sidelink signaling via the set of mini-slots according to a sidelink transmission mode of operation associated with the set of mini-slots.

In some examples, the sidelink transmission mode component 740 may be configured as or otherwise support a means for receiving, in the control signaling, an indication of a sidelink transmission mode of operation, where receiving the sidelink signaling is based on the indication of the sidelink transmission mode of operation.

In some examples, the sidelink transmission mode component 740 may be configured as or otherwise support a means for receiving, in the SCI, an indication of the sidelink transmission mode of operation, where receiving the sidelink signaling is based on the indication of the sidelink transmission mode of operation.

In some examples, to support receiving the sidelink signaling, the sidelink communications component 735 may be configured as or otherwise support a means for receiving a first TB via a first mini-slot of the set of mini-slots according to the sidelink transmission mode of operations. In some examples, to support receiving the sidelink signaling, the sidelink communications component 735 may be configured as or otherwise support a means for receiving a second TB via a second mini-slot of the set of mini-slots according to the sidelink transmission mode of operations.

In some examples, to support receiving the sidelink signaling, the sidelink communications component 735 may be configured as or otherwise support a means for receiving a first TB via each mini-slot of the set of mini-slots according to the sidelink transmission mode of operations.

In some examples, to support performing the sidelink communications, the sidelink communications component 735 may be configured as or otherwise support a means for refraining from transmitting sidelink signaling via the set of mini-slots based on the reservation of the set of mini-slots.

In some examples, the sidelink retransmission component 760 may be configured as or otherwise support a means for receiving, in the SCI, an indication of a set of slots for retransmissions of the set of mini-slots of the first slot.

In some examples, the indication of the set of slots includes a set of time offsets, a set of frequency offsets, or both, each time offset, frequency offset, or both, is associated with a respective slot of the set of slots.

In some examples, to support reservation of the set of mini-slots, the bitmap component 750 may be configured as or otherwise support a means for a bitmap indicating the set of mini-slots of the set of multiple mini-slots.

In some examples, to support reservation of the set of mini-slots, the mini-slot reservation component 755 may be configured as or otherwise support a means for an indication of time resources, frequency resources, or both, for each mini-slot of the set of mini-slots of the set of multiple mini-slots.

In some examples, to support receiving the SCI, the sidelink communications component 735 may be configured as or otherwise support a means for receiving a first SCI message including an indication of a first mini-slot of the set of mini-slots. In some examples, to support receiving the SCI, the sidelink communications component 735 may be configured as or otherwise support a means for receiving, in the first mini-slot of the set of mini-slots based on the first SCI message, a second SCI message including an indication of a second mini-slot of the set of mini-slots.

In some examples, the first mini-slot includes a first quantity of the set of sidelink shared resources and the second mini-slot includes a second quantity of the set of sidelink shared resources that is different from the first quantity of the set of sidelink shared resources.

Figure 8:
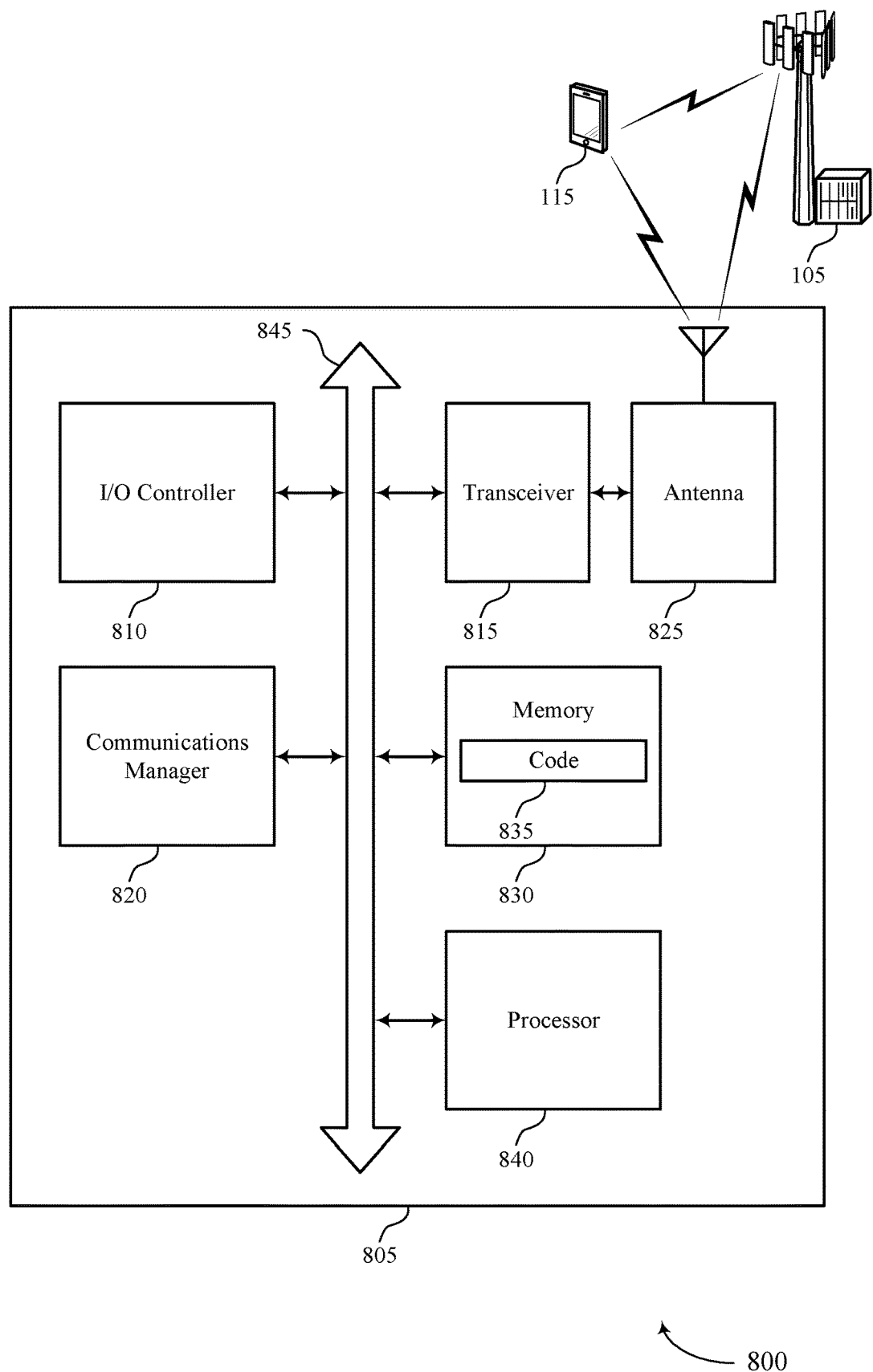
FIG. 8 shows a diagram of a system including a device that supports techniques for sidelink mini-slot assignment and use in accordance with one or more aspects of the present disclosure.

FIG. 8 shows a diagram of a system 800 including a device 805 that supports techniques for sidelink mini-slot assignment and use in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for sidelink mini-slot assignment and use). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The communications manager 820 may be configured as or otherwise support a means for transmitting SCI including a reservation of a set of mini-slots of a first slot of the set of multiple slots, where a quantity of the set of mini-slots satisfies the threshold quantity of mini-slot reservations. The communications manager 820 may be configured as or otherwise support a means for transmitting sidelink signaling via the set of mini-slots according to a sidelink transmission mode of operation associated with the set of mini-slots.

Additionally, or alternatively, the communications manager 820 may support wireless communications at a UE in accordance with examples as disclosed herein. For example, the communications manager 820 may be configured as or otherwise support a means for receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The communications manager 820 may be configured as or otherwise support a means for receiving SCI including a reservation of a set of mini-slots of a first slot of the set of multiple slots, where a quantity of the set of mini-slots satisfies the threshold quantity of mini-slot reservations. The communications manager 820 may be configured as or otherwise support a means for performing sidelink communications via one or more of the set of multiple slots according to the reservation of the set of mini-slots.

By including or configuring the communications manager 820 in accordance with examples as described herein, the device 805 may support techniques for sidelink communications via one or more mini-slots resulting in more reduced latency, reduced scheduling time, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for sidelink mini-slot assignment and use as described herein, or the processor 840 and the memory 830 may be otherwise configured to perform or support such operations.

Figure 9:
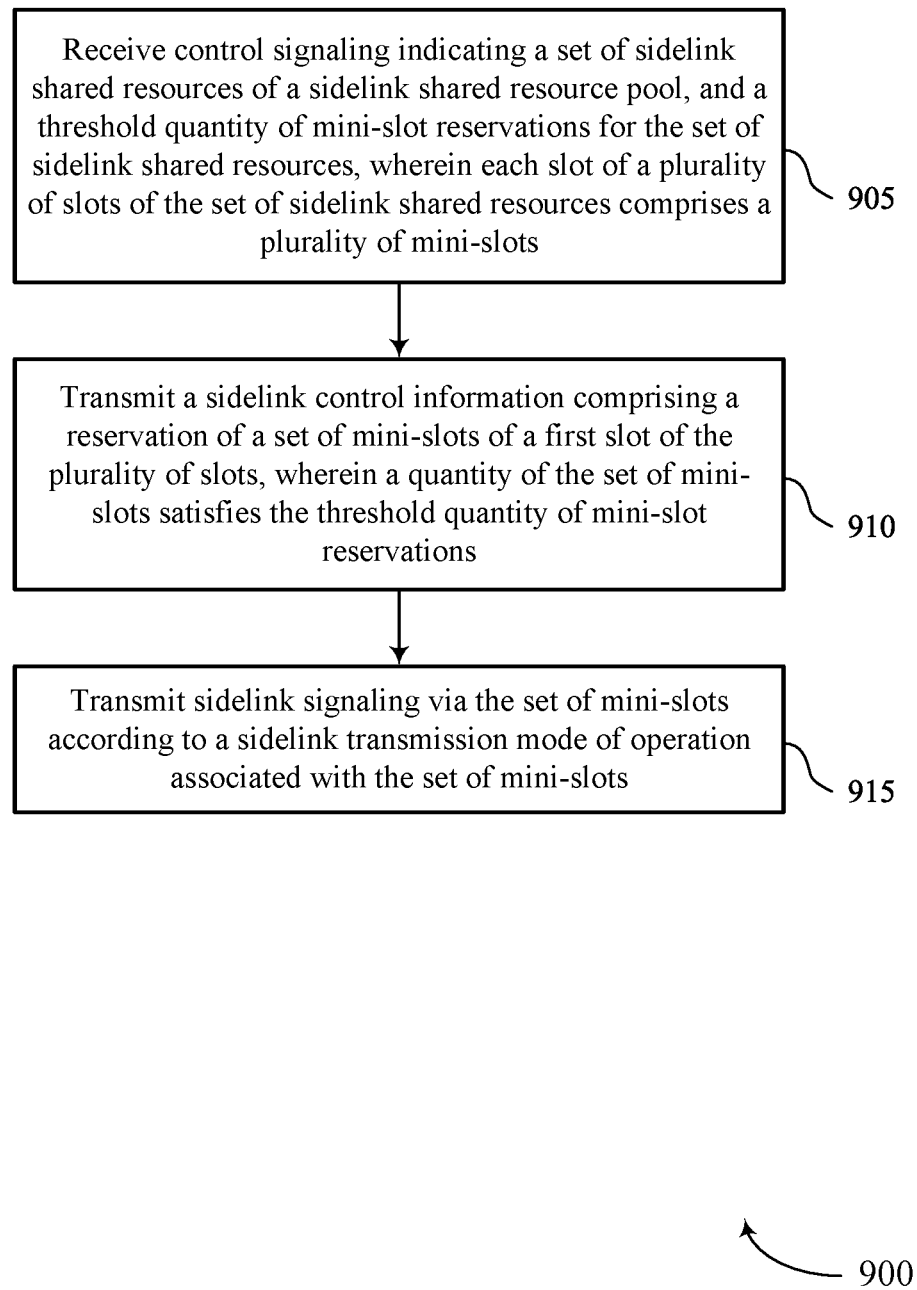
FIGS. 9 through 12 show flowcharts illustrating methods that support techniques for sidelink mini-slot assignment and use in accordance with one or more aspects of the present disclosure.

FIG. 9 shows a flowchart illustrating a method 900 that supports techniques for sidelink mini-slot assignment and use in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The operations of 905 may be performed in accordance with examples as disclosed herein. In some examples, aspects of the operations of 905 may be performed by a control signaling component 725 as described with reference to FIG. 7.

At 910, the method may include transmitting a SCI including a reservation of a set of mini-slots of a first slot of the set of multiple slots, where a quantity of the set of mini-slots satisfies the threshold quantity of mini-slot reservations. The operations of 910 may be performed in accordance with examples as disclosed herein. In some examples, aspects of the operations of 910 may be performed by an SCI component 730 as described with reference to FIG. 7.

At 915, the method may include transmitting sidelink signaling via the set of mini-slots according to a sidelink transmission mode of operation associated with the set of mini-slots. The operations of 915 may be performed in accordance with examples as disclosed herein. In some examples, aspects of the operations of 915 may be performed by a sidelink communications component 735 as described with reference to FIG. 7.

Figure 10:
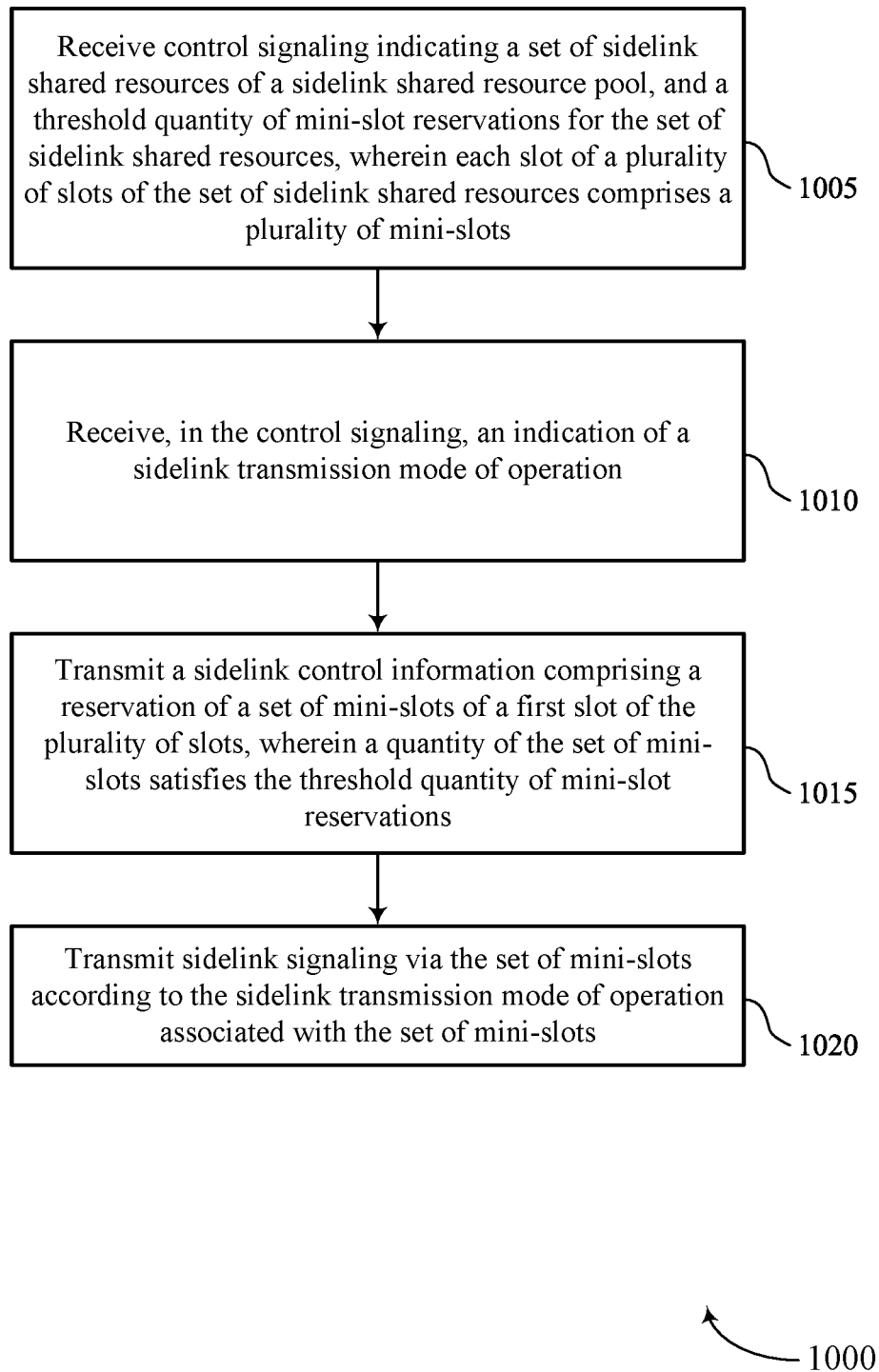

FIG. 10 shows a flowchart illustrating a method 1000 that supports techniques for sidelink mini-slot assignment and use in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The operations of 1005 may be performed in accordance with examples as disclosed herein. In some examples, aspects of the operations of 1005 may be performed by a control signaling component 725 as described with reference to FIG. 7.

At 1010, the method may include receiving, in the control signaling, an indication of the sidelink transmission mode of operation. The operations of 1010 may be performed in accordance with examples as disclosed herein. In some examples, aspects of the operations of 1010 may be performed by a sidelink transmission mode component 740 as described with reference to FIG. 7.

At 1015, the method may include transmitting a SCI including a reservation of a set of mini-slots of a first slot of the set of multiple slots, where a quantity of the set of mini-slots satisfies the threshold quantity of mini-slot reservations. The operations of 1015 may be performed in accordance with examples as disclosed herein. In some examples, aspects of the operations of 1015 may be performed by an SCI component 730 as described with reference to FIG. 7.

At 1020, the method may include transmitting sidelink signaling via the set of mini-slots according to the sidelink transmission mode of operation associated with the set of mini-slots. The operations of 1020 may be performed in accordance with examples as disclosed herein. In some examples, aspects of the operations of 1020 may be performed by a sidelink communications component 735 as described with reference to FIG. 7.

Figure 11:
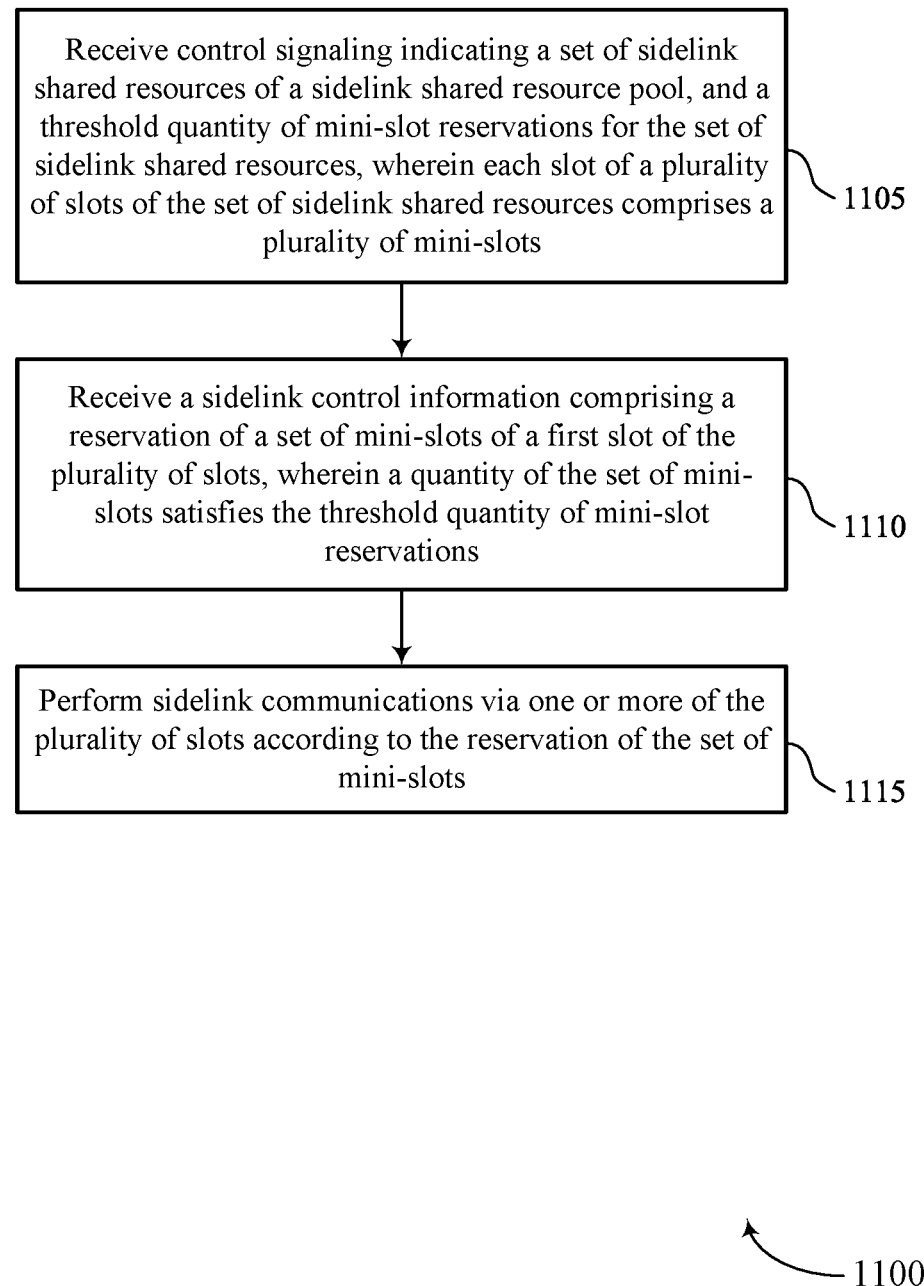

FIG. 11 shows a flowchart illustrating a method 1100 that supports techniques for sidelink mini-slot assignment and use in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The operations of 1105 may be performed in accordance with examples as disclosed herein. In some examples, aspects of the operations of 1105 may be performed by a control signaling component 725 as described with reference to FIG. 7.

At 1110, the method may include receiving a SCI including a reservation of a set of mini-slots of a first slot of the set of multiple slots, where a quantity of the set of mini-slots satisfies the threshold quantity of mini-slot reservations. The operations of 1110 may be performed in accordance with examples as disclosed herein. In some examples, aspects of the operations of 1110 may be performed by an SCI component 730 as described with reference to FIG. 7.

At 1115, the method may include performing sidelink communications via one or more of the set of multiple slots according to the reservation of the set of mini-slots. The operations of 1115 may be performed in accordance with examples as disclosed herein. In some examples, aspects of the operations of 1115 may be performed by a sidelink communications component 735 as described with reference to FIG. 7.

Figure 12:
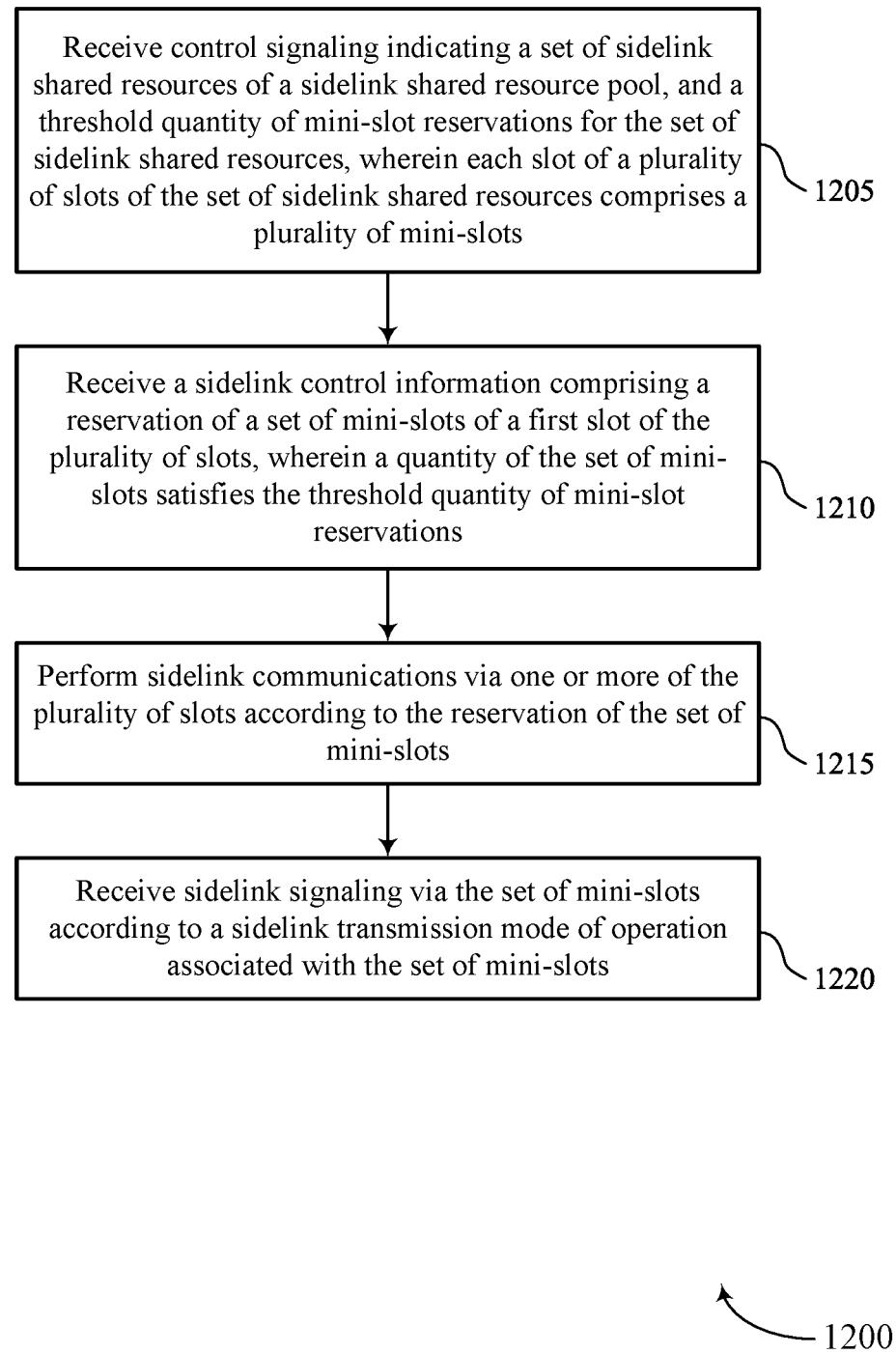

FIG. 12 shows a flowchart illustrating a method 1200 that supports techniques for sidelink mini-slot assignment and use in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving control signaling indicating a set of sidelink shared resources of a sidelink shared resource pool, and a threshold quantity of mini-slot reservations for the set of sidelink shared resources, where each slot of a set of multiple slots of the set of sidelink shared resources includes a set of multiple mini-slots. The operations of 1205 may be performed in accordance with examples as disclosed herein. In some examples, aspects of the operations of 1205 may be performed by a control signaling component 725 as described with reference to FIG. 7.

At 1210, the method may include receiving a SCI including a reservation of a set of mini-slots of a first slot of the set of multiple slots, where a quantity of the set of mini-slots satisfies the threshold quantity of mini-slot reservations. The operations of 1210 may be performed in accordance with examples as disclosed herein. In some examples, aspects of the operations of 1210 may be performed by an SCI component 730 as described with reference to FIG. 7.

At 1215, the method may include performing sidelink communications via one or more of the set of multiple slots according to the reservation of the set of mini-slots. The operations of 1215 may be performed in accordance with examples as disclosed herein. In some examples, aspects of the operations of 1215 may be performed by a sidelink communications component 735 as described with reference to FIG. 7.

At 1220, the method may include receiving sidelink signaling via the set of mini-slots according to a sidelink transmission mode of operation associated with the set of mini-slots. The operations of 1220 may be performed in accordance with examples as disclosed herein. In some examples, aspects of the operations of 1220 may be performed by a sidelink communications component 735 as described with reference to FIG. 7.

The following provides an overview of aspects of the present disclosure:

Aspect 1: A method for wireless communications at a UE, comprising: receiving control signaling indicating a set of sidelink shared resources of a sidelink shared resource pool, and a threshold quantity of mini-slot reservations for the set of sidelink shared resources, wherein each slot of a plurality of slots of the set of sidelink shared resources comprises a plurality of mini-slots; transmitting a SCI comprising a reservation of a set of mini-slots of a first slot of the plurality of slots, wherein a quantity of the set of mini-slots satisfies the threshold quantity of mini-slot reservations; and transmitting sidelink signaling via the set of mini-slots according to a sidelink transmission mode of operation associated with the set of mini-slots.

Aspect 2: The method of aspect 1, further comprising: receiving, in the control signaling, an indication of the sidelink transmission mode of operation, wherein transmitting the sidelink signaling is based at least in part on the indication of the sidelink transmission mode of operation.

Aspect 3: The method of any of aspects 1 through 2, further comprising: including, in the SCI, an indication of the sidelink transmission mode of operation, wherein transmitting the sidelink signaling is based at least in part on the indication of the sidelink transmission mode of operation.

Aspect 4: The method of any of aspects 1 through 3, wherein transmitting the sidelink signaling comprises: transmitting a first TB via a first mini-slot of the set of mini-slots according to the sidelink transmission mode of operations; and transmitting a second TB via a second mini-slot of the set of mini-slots according to the sidelink transmission mode of operations.

Aspect 5: The method of any of aspects 1 through 3, wherein transmitting the sidelink signaling comprises: transmitting a first TB via each mini-slot of the set of mini-slots according to the sidelink transmission mode of operations.

Aspect 6: The method of any of aspects 1 through 5, further comprising: including, in the SCI, an indication of a set of slots for retransmissions of the set of mini-slots of the first slot.

Aspect 7: The method of aspect 6, wherein the indication of the set of slots comprises a set of time offsets, a set of frequency offsets, or both, each time offset, frequency offset, or both, is associated with a respective slot of the set of slots.

Aspect 8: The method of any of aspects 6 through 7, further comprising: retransmitting the sidelink signaling via the set of mini-slots within each slot of the set of slots according to the indication of the set of slots.

Aspect 9: The method of any of aspects 1 through 8, wherein the reservation of the set of mini-slots comprises: a bitmap indicating the set of mini-slots of the plurality of mini-slots.

Aspect 10: The method of any of aspects 1 through 9, wherein the reservation of the set of mini-slots comprises: an indication of time resources, frequency resources, or both, for each mini-slot of the set of mini-slots of the plurality of mini-slots.

Aspect 11: The method of any of aspects 1 through 10, wherein transmitting the SCI comprises: transmitting a first SCI message comprising an indication of a first mini-slot of the set of mini-slots; and transmitting, in the first mini-slot of the set of mini-slots based at least in part on the first SCI message, a second SCI message comprising an indication of a second mini-slot of the set of mini-slots.

Aspect 12: The method of aspect 11, wherein the first mini-slot comprises a first quantity of the set of sidelink shared resources and the second mini-slot comprises a second quantity of the set of sidelink shared resources that is different from the first quantity of the set of sidelink shared resources.

Aspect 13: A method for wireless communications at a UE, comprising: receiving control signaling indicating a set of sidelink shared resources of a sidelink shared resource pool, and a threshold quantity of mini-slot reservations for the set of sidelink shared resources, wherein each slot of a plurality of slots of the set of sidelink shared resources comprises a plurality of mini-slots; receiving a SCI comprising a reservation of a set of mini-slots of a first slot of the plurality of slots, wherein a quantity of the set of mini-slots satisfies the threshold quantity of mini-slot reservations; and performing sidelink communications via one or more of the plurality of slots according to the reservation of the set of mini-slots.

Aspect 14: The method of aspect 13, wherein performing the sidelink communications comprises: receiving sidelink signaling via the set of mini-slots according to a sidelink transmission mode of operation associated with the set of mini-slots.

Aspect 15: The method of aspect 14, further comprising: receiving, in the control signaling, an indication of a sidelink transmission mode of operation, wherein receiving the sidelink signaling is based at least in part on the indication of the sidelink transmission mode of operation.

Aspect 16: The method of any of aspects 14 through 15, further comprising: receiving, in the SCI, an indication of the sidelink transmission mode of operation, wherein receiving the sidelink signaling is based at least in part on the indication of the sidelink transmission mode of operation.

Aspect 17: The method of any of aspects 14 through 16, wherein receiving the sidelink signaling comprises: receiving a first TB via a first mini-slot of the set of mini-slots according to the sidelink transmission mode of operations; and receiving a second TB via a second mini-slot of the set of mini-slots according to the sidelink transmission mode of operations.

Aspect 18: The method of any of aspects 14 through 16, wherein receiving the sidelink signaling comprises: receiving a first TB via each mini-slot of the set of mini-slots according to the sidelink transmission mode of operations.

Aspect 19: The method of any of aspects 13 through 18, wherein performing the sidelink communications comprises: refraining from transmitting sidelink signaling via the set of mini-slots based at least in part on the reservation of the set of mini-slots.

Aspect 20: The method of any of aspects 13 through 19, further comprising: receiving, in the SCI, an indication of a set of slots for retransmissions of the set of mini-slots of the first slot.

Aspect 21: The method of aspect 20, wherein the indication of the set of slots comprises a set of time offsets, a set of frequency offsets, or both, each time offset, frequency offset, or both, is associated with a respective slot of the set of slots.

Aspect 22: The method of any of aspects 13 through 21, wherein the reservation of the set of mini-slots comprises: a bitmap indicating the set of mini-slots of the plurality of mini-slots.

Aspect 23: The method of any of aspects 13 through 22, wherein the reservation of the set of mini-slots comprises: an indication of time resources, frequency resources, or both, for each mini-slot of the set of mini-slots of the plurality of mini-slots.

Aspect 24: The method of any of aspects 13 through 23, wherein receiving the SCI comprises: receiving a first SCI message comprising an indication of a first mini-slot of the set of mini-slots; and receiving, in the first mini-slot of the set of mini-slots based at least in part on the first SCI message, a second SCI message comprising an indication of a second mini-slot of the set of mini-slots.

Aspect 25: The method of aspect 24, wherein the first mini-slot comprises a first quantity of the set of sidelink shared resources and the second mini-slot comprises a second quantity of the set of sidelink shared resources that is different from the first quantity of the set of sidelink shared resources.

Aspect 26: An apparatus for wireless communications at a UE, comprising: a processor; memory coupled with the processor; and instructions stored in the memory and executable by the processor to cause the apparatus to perform a method of any of aspects 1 through 12.

Aspect 27: An apparatus for wireless communications at a UE, comprising at least one means for performing a method of any of aspects 1 through 12.

Aspect 28: A non-transitory computer-readable medium storing code for wireless communications at a UE, the code comprising instructions executable by a processor to perform a method of any of aspects 1 through 12.

Aspect 29: An apparatus for wireless communications at a UE, comprising a processor; memory coupled with the processor; and instructions stored in the memory and executable by the processor to cause the apparatus to perform a method of any of aspects 13 through 25.

Aspect 30: An apparatus for wireless communications at a UE, comprising at least one means for performing a method of any of aspects 13 through 25.

Aspect 31: A non-transitory computer-readable medium storing code for wireless communications at a UE, the code comprising instructions executable by a processor to perform a method of any of aspects 13 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor;
memory coupled with the processor; and
instructions stored in the memory and executable by the processor to cause the apparatus to:
receive control signaling indicating a set of sidelink shared resources of a sidelink shared resource pool, and a threshold quantity of mini-slot reservations for the set of sidelink shared resources, wherein each slot of a plurality of slots of the set of sidelink shared resources comprises a plurality of mini-slots;
transmit a sidelink control information comprising a reservation of a set of mini-slots of a first slot of the plurality of slots, wherein a quantity of the set of mini-slots satisfies the threshold quantity of mini-slot reservations;
transmit sidelink signaling via the set of mini-slots according to a sidelink transmission mode of operation associated with the set of mini-slots; and
wherein the instructions to transmit the sidelink control information are executable by the processor to cause the apparatus to:
transmit a first sidelink control information message comprising an indication of a first mini-slot of the set of mini-slots; and
transmit, in the first mini-slot of the set of mini-slots based at least in part on the first sidelink control information message, a second sidelink control information message comprising an indication of a second mini-slot of the set of mini-slots.

2. The apparatus of claim 1, wherein the instructions are further executable by the processor to cause the apparatus to:
receive, in the control signaling, an indication of the sidelink transmission mode of operation, wherein transmitting the sidelink signaling is based at least in part on the indication of the sidelink transmission mode of operation.

3. The apparatus of claim 1, wherein the instructions are further executable by the processor to cause the apparatus to:
include, in the sidelink control information, an indication of the sidelink transmission mode of operation, wherein transmitting the sidelink signaling is based at least in part on the indication of the sidelink transmission mode of operation.

4. The apparatus of claim 1, wherein the instructions to transmit the sidelink signaling are executable by the processor to cause the apparatus to:
transmit a first transport block via a first mini-slot of the set of mini-slots according to the sidelink transmission mode of operations; and
transmit a second transport block via a second mini-slot of the set of mini-slots according to the sidelink transmission mode of operations.

5. The apparatus of claim 1, wherein the instructions to transmit the sidelink signaling are executable by the processor to cause the apparatus to:
transmit a first transport block via each mini-slot of the set of mini-slots according to the sidelink transmission mode of operations.

6. The apparatus of claim 1, wherein the instructions are further executable by the processor to cause the apparatus to:
include, in the sidelink control information, an indication of a set of slots for retransmissions of the set of mini-slots of the first slot.

7. The apparatus of claim 6, wherein the indication of the set of slots comprises a set of time offsets, a set of frequency offsets, or both, each time offset, frequency offset, or both, is associated with a respective slot of the set of slots.

8. The apparatus of claim 6, wherein the instructions are further executable by the processor to cause the apparatus to:
retransmit the sidelink signaling via the set of mini-slots within each slot of the set of slots according to the indication of the set of slots.

9. The apparatus of claim 1, wherein the instructions to reservation of the set of mini-slots are executable by the processor to cause the apparatus to:
a bitmap indicate the set of mini-slots of the plurality of mini-slots.

10. The apparatus of claim 1, wherein the instructions to reservation of the set of mini-slots are executable by the processor to cause the apparatus to:
an indication of time resources, frequency resources, or both, for each mini-slot of the set of mini-slots of the plurality of mini-slots.

11. The apparatus of claim 1, wherein the first mini-slot comprises a first quantity of the set of sidelink shared resources and the second mini-slot comprises a second quantity of the set of sidelink shared resources that is different from the first quantity of the set of sidelink shared resources.

12. An apparatus for wireless communications at a user equipment (UE), comprising:
a processor;
memory coupled with the processor; and
instructions stored in the memory and executable by the processor to cause the apparatus to:
receive control signaling indicating a set of sidelink shared resources of a sidelink shared resource pool, and a threshold quantity of mini-slot reservations for the set of sidelink shared resources, wherein each slot of a plurality of slots of the set of sidelink shared resources comprises a plurality of mini-slots;
receive a sidelink control information comprising a reservation of a set of mini-slots of a first slot of the plurality of slots, wherein a quantity of the set of mini-slots satisfies the threshold quantity of mini-slot reservations;

perform sidelink communications via one or more of the plurality of slots according to the reservation of the set of mini-slots; and wherein the instructions to receive the sidelink control information are executable by the processor to cause the apparatus to:

receive a first sidelink control information message comprising an indication of a first mini-slot of the set of mini-slots; and receive, in the first mini-slot of the set of mini-slots based at least in part on the first sidelink control information message, a second sidelink control information message comprising an indication of a second mini-slot of the set of mini-slots.

13. The apparatus of claim 12, wherein the instructions to perform the sidelink communications are executable by the processor to cause the apparatus to:

receive sidelink signaling via the set of mini-slots according to a sidelink transmission mode of operation associated with the set of mini-slots.

14. The apparatus of claim 13, wherein the instructions are further executable by the processor to cause the apparatus to:

receive, in the control signaling, an indication of a sidelink transmission mode of operation, wherein receiving the sidelink signaling is based at least in part on the indication of the sidelink transmission mode of operation.

15. The apparatus of claim 13, wherein the instructions are further executable by the processor to cause the apparatus to:

receive, in the sidelink control information, an indication of the sidelink transmission mode of operation, wherein receiving the sidelink signaling is based at least in part on the indication of the sidelink transmission mode of operation.

16. The apparatus of claim 13, wherein the instructions to receive the sidelink signaling are executable by the processor to cause the apparatus to:

receive a first transport block via a first mini-slot of the set of mini-slots according to the sidelink transmission mode of operations; and receive a second transport block via a second mini-slot of the set of mini-slots according to the sidelink transmission mode of operations.

17. The apparatus of claim 13, wherein the instructions to receive the sidelink signaling are executable by the processor to cause the apparatus to:

receive a first transport block via each mini-slot of the set of mini-slots according to the sidelink transmission mode of operations.

18. The apparatus of claim 12, wherein the instructions to perform the sidelink communications are executable by the processor to cause the apparatus to:

refrain from transmitting sidelink signaling via the set of mini-slots based at least in part on the reservation of the set of mini-slots.

19. The apparatus of claim 12, wherein the instructions are further executable by the processor to cause the apparatus to:

receive, in the sidelink control information, an indication of a set of slots for retransmissions of the set of mini-slots of the first slot.

20. The apparatus of claim 19, wherein the indication of the set of slots comprises a set of time offsets, a set of frequency offsets, or both, each time offset, frequency offset, or both, is associated with a respective slot of the set of slots.

21. The apparatus of claim 12, wherein the instructions to reservation of the set of mini-slots are executable by the processor to cause the apparatus to:

a bitmap indicate the set of mini-slots of the plurality of mini-slots.

22. The apparatus of claim 12, wherein the instructions to reservation of the set of mini-slots are executable by the processor to cause the apparatus to:

an indication of time resources, frequency resources, or both, for each mini-slot of the set of mini-slots of the plurality of mini-slots.

23. The apparatus of claim 12, wherein the first mini-slot comprises a first quantity of the set of sidelink shared resources and the second mini-slot comprises a second quantity of the set of sidelink shared resources that is different from the first quantity of the set of sidelink shared resources.

24. A method for wireless communications at a user equipment (UE), comprising:

receiving control signaling indicating a set of sidelink shared resources of a sidelink shared resource pool, and a threshold quantity of mini-slot reservations for the set of sidelink shared resources, wherein each slot of a plurality of slots of the set of sidelink shared resources comprises a plurality of mini-slots;

transmitting a sidelink control information comprising a reservation of a set of mini-slots of a first slot of the plurality of slots, wherein a quantity of the set of mini-slots satisfies the threshold quantity of mini-slot reservations;

transmitting sidelink signaling via the set of mini-slots according to a sidelink transmission mode of operation associated with the set of mini-slots; and wherein transmitting the sidelink control information includes:

transmitting a first sidelink control information message comprising an indication of a first mini-slot of the set of mini-slots; and transmitting, in the first mini-slot of the set of mini-slots based at least in part on the first sidelink control information message, a second sidelink control information message comprising an indication of a second mini-slot of the set of mini-slots.

25. The method of claim 24, further comprising:

receiving, in the control signaling, an indication of the sidelink transmission mode of operation, wherein transmitting the sidelink signaling is based at least in part on the indication of the sidelink transmission mode of operation.

26. The method of claim 24, further comprising:

including, in the sidelink control information, an indication of the sidelink transmission mode of operation, wherein transmitting the sidelink signaling is based at least in part on the indication of the sidelink transmission mode of operation.

27. A method for wireless communications at a user equipment (UE), comprising:

receiving control signaling indicating a set of sidelink shared resources of a sidelink shared resource pool, and a threshold quantity of mini-slot reservations for the set of sidelink shared resources, wherein each slot of a plurality of slots of the set of sidelink shared resources comprises a plurality of mini-slots;

receiving a sidelink control information comprising a reservation of a set of mini-slots of a first slot of the plurality of slots, wherein a quantity of the set of mini-slots satisfies the threshold quantity of mini-slot reservations;

performing sidelink communications via one or more of the plurality of slots according to the reservation of the set of mini-slots; and wherein receiving the sidelink control information includes:

receiving a first sidelink control information message comprising an indication of a first mini-slot of the set of mini-slots; and receiving, in the first mini-slot of the set of mini-slots based at least in part on the first sidelink control information message, a second sidelink control information message comprising an indication of a second mini-slot of the set of mini-slots.

28. The method of claim 27, wherein performing the sidelink communications comprises:

receiving sidelink signaling via the set of mini-slots according to a sidelink transmission mode of operation associated with the set of mini-slots.

* * * * *